United States Patent
Zhao et al.

(10) Patent No.: US 10,127,901 B2
(45) Date of Patent: Nov. 13, 2018

(54) HYPER-STRUCTURE RECURRENT NEURAL NETWORKS FOR TEXT-TO-SPEECH

(71) Applicant: Microsoft Technology Licensing, LLC, Redmond, WA (US)

(72) Inventors: Pei Zhao, Beijing (CN); Max Leung, Beijing (CN); Kaisheng Yao, Newcastle, WA (US); Bo Yan, Union City, CA (US); Sheng Zhao, Beijing (CN); Fileno A. Alleva, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/303,969

(22) Filed: Jun. 13, 2014

(65) Prior Publication Data

US 2015/0364128 A1    Dec. 17, 2015

(51) Int. Cl.
*G10L 13/10*        (2013.01)
*G06N 3/02*         (2006.01)
(Continued)

(52) U.S. Cl.
CPC .............. *G10L 13/08* (2013.01); *G06N 3/02* (2013.01); *G06N 3/0445* (2013.01); *G10L 13/10* (2013.01)

(58) Field of Classification Search
CPC ......... G10L 25/30; G10L 13/08; G10L 13/10; G06N 3/0445; G06N 3/02
(Continued)

(56) References Cited

U.S. PATENT DOCUMENTS

| 4,736,296 A | 4/1988 | Katayama |
| 6,026,358 A | 2/2000 | Tomabechi |

(Continued)

FOREIGN PATENT DOCUMENTS

| WO | WO 2000008634 A1 | 2/2000 |
| WO | WO 2003017251 A1 | 2/2003 |

OTHER PUBLICATIONS

Ala-Keturi, Veera, "Speech Recognition Based on Artificial Neural Networks", Proceedings in Helsinki University of Technology, located at: http://www.cis.hut.fi/Opinnot/T-61.6040/pellom-2004/project-reports/project_07.pdf, May 27, 2013, 6 pgs.

(Continued)

*Primary Examiner* — Bharatkumar S Shah

(57) ABSTRACT

The technology relates to converting text to speech utilizing recurrent neural networks (RNNs). The recurrent neural networks may be implemented as multiple modules for determining properties of the text. In embodiments, a part-of-speech RNN module, letter-to-sound RNN module, a linguistic prosody tagger RNN module, and a context awareness and semantic mining RNN module may all be utilized. The properties from the RNN modules are processed by a hyper-structure RNN module that determine the phonetic properties of the input text based on the outputs of the other RNN modules. The hyper-structure RNN module may generate a generation sequence that is capable of being converting to audible speech by a speech synthesizer. The generation sequence may also be optimized by a global optimization module prior to being synthesized into audible speech.

20 Claims, 16 Drawing Sheets

(51) Int. Cl.
   *G10L 13/08* (2013.01)
   *G06N 3/04* (2006.01)
(58) Field of Classification Search
   USPC ......................................................... 704/259
   See application file for complete search history.

(56) References Cited

U.S. PATENT DOCUMENTS

| | | | |
|---|---|---|---|
| 8,126,717 | B1 | 2/2012 | Strom |
| 8,249,881 | B2 | 8/2012 | Roy |
| 8,352,270 | B2 | 1/2013 | Wang |
| 8,504,361 | B2 | 8/2013 | Collobert et al. |
| 8,527,276 | B1* | 9/2013 | Senior .................... G06N 3/084 704/258 |
| 1,877,534 | A1 | 7/2014 | Commons |
| 2003/0135356 | A1* | 7/2003 | Ying .................... G06F 17/271 704/1 |
| 2003/0233233 | A1 | 12/2003 | Hong |
| 2004/0167778 | A1 | 8/2004 | Valsan |
| 2006/0184471 | A1 | 8/2006 | Minamino et al. |
| 2006/0184483 | A1 | 8/2006 | Clark |
| 2007/0219792 | A1 | 9/2007 | Normandin |
| 2008/0114595 | A1 | 5/2008 | Vair et al. |
| 2008/0120257 | A1 | 5/2008 | Goyal |
| 2008/0221878 | A1 | 9/2008 | Collobert |
| 2009/0048843 | A1* | 2/2009 | Nitisaroj ............. G10L 15/1807 704/260 |
| 2009/0089058 | A1 | 4/2009 | Bellegarda |
| 2009/0204605 | A1 | 8/2009 | Bai |
| 2009/0210218 | A1 | 8/2009 | Collobert et al. |
| 2009/0326945 | A1 | 12/2009 | Tian |
| 2010/0010949 | A1 | 1/2010 | Ito et al. |
| 2010/0217684 | A1 | 8/2010 | Melcher et al. |
| 2011/0029517 | A1 | 2/2011 | Ji |
| 2011/0040554 | A1 | 2/2011 | Audhkhasi et al. |
| 2011/0301942 | A1 | 12/2011 | Collobert |
| 2012/0065976 | A1 | 3/2012 | Deng |
| 2012/0072215 | A1 | 3/2012 | Yu et al. |
| 2013/0138436 | A1 | 5/2013 | Yu et al. |
| 2013/0262096 | A1 | 10/2013 | Wilhems-Tricario et al. |
| 2014/0025382 | A1* | 1/2014 | Chen ........................ G10L 13/02 704/260 |
| 2014/0142929 | A1 | 5/2014 | Seide et al. |
| 2014/0278355 | A1 | 9/2014 | Sarikaya |
| 2014/0278379 | A1 | 9/2014 | Coccaro |
| 2014/0278424 | A1 | 9/2014 | Deng et al. |
| 2014/0278985 | A1 | 9/2014 | Ramakrishnan |
| 2015/0066496 | A1 | 3/2015 | Deoras |
| 2015/0161101 | A1 | 6/2015 | Yao et al. |
| 2015/0340032 | A1* | 11/2015 | Gruenstein ............. G10L 15/16 704/232 |
| 2015/0364127 | A1 | 12/2015 | Zhao et al. |

OTHER PUBLICATIONS

Arisoy, et al., "Deep Neural Network Language Models", In Proceedings of the NAACL-HLT Workshop: Will We Ever Really Replace the N-gram Model? On the Future of Language Modeling for HLT, Jun. 8, 2012, 9 pages.
Bengio, et al., "A Neural Probabilistic Language Model", In Journal of Machine Learning Research, vol. 3, Issue 6, Feb. 2003, 19 pages.
Bengio, et al., "A Neural Probabilistic Language Model", In Proceedings of Advances in Neural Information Processing Systems, vol. 13, Nov. 28, 2000, 7 pages.
Bilcu, Eniko Beatrtice, "Text-To-Phoneme Mapping Using Neural Networks", Tampere University of Technology, Publication 759, Oct. 22, 2008, 150 pgs.
Boros, Tiberiu et al., "Large tagset labeling using Feed Forward Neural Networks. Case study on Romanian Language", Aug. 4, 2013, Proceedings of the 51st Annual Meeting of the Association for Computational Linguistics, vol. 1, 9 pgs.
Brown, et al., "Class-Based N-Gram Models of Natural Language", In Journal of Computational Linguistics, vol. 18, Issue 4, Dec. 1982, 14 pages.
Chandak, M. B. et al., "Text to Speech Synthesis with Prosody feature: Implementation of Emotion in Speech Output using Forward Parsing", Aug. 10, 2010, International Journal of Computer Science and Security, vol. 4, Issue 3, 9 pgs.
Collobert, et al., "A Unified Architecture for Natural Language Processing: Deep Neural Networks with Multitask Learning", In Proceedings of the 25th International Conference on Machine Learning, Jul. 5, 2008, 8 pages.
Collobert, et al., "Natural Language Processing (almost) from Scratch", In the Journal of Machine Learning Research, vol. 12, Aug. 2011, 45 pages.
Dahl, et al., "Context-Dependent Pre-trained Deep Neural Networks for Large Vocabulary Speech Recognition", In Journal of IEEE Transactions on Audio, Speech, and Language Processing, vol. 20, Issue 1, Jan. 2012, 13 pages.
Dahl, et al., "Expanding the Scope of the ATIS Task: The ATIS-3 Corpus", In Proceedings of the Workshop on Human Language Technology, Mar. 8, 1994, 6 pages.
Dauphin, et al., "Large-Scale Learning of Embeddings with Reconstruction Sampling", In Proceedings of the 28th International Conference on Machine Learning, Jun. 28, 2011, 8 pages.
Deng, et al., "Use of Kernel Deep Convex Networks and End-To-End Learning for Spoken Language Understanding", In Proceedings of IEEE Workshop on Spoken Language Technologies, Dec. 2, 2012, 6 pages.
Deoras, et al., "Deep Belief Network based Semantic Taggers for Spoken Language Understanding", In ISCA INTERSPEECH, Sep. 2013, 5 pages.
Deoras, et al., "Joint Decoding for Speech Recognition and Semantic Tagging", In Proceedings of 13th Annual Conference of the International Speech Communication Association, Sep. 9, 2012, 4 pages.
Deoras, et al., "Joint Discriminative Decoding of Words and Semantic Tags for Spoken Language Understanding", In Proceedings of IEEE Transactions on Audio, Speech, and Language Processing, vol. 28, Issue 8, Apr. 25, 2013, 24 pages.
Dietterich, Thomas G., "Machine Learning for Sequential Data: A Review", Proceedings of the Joint IAPR International Workshop on Structural, Syntactic, and Statistical Pattern Recognition, Aug. 6, 2002, 15 pgs.
Dowding, et al., "Gemini: A Natural Language System for Spoken-Language Understanding", In Proceedings of the 31st Annual Meeting on Association for Computational Linguistics, Jun. 22, 1993, 8 pages.
Elman, Jeffrey L., "Finding Structure in Time", In Journal of Cognitive Science, vol. 14, Issue 2, Mar. 1990, 28 pages.
Fernandez, et al., "Sequence Labelling in Structured Domains with Hierarchical Recurrent Neural Networks", In Proceedings of the 20th International Joint Conference on Artificial Intelligence, Jan. 6, 2007, 6 pages.
Graves, Alex, "Supervised Sequence Labelling with Recurrent Neural Networks", Published on: Jan. 2012, Available at: http://www.cs.toronto.edu/~graves/phd.pdf, 124 pgs.
He, et al., "A Data-Driven Spoken Language Understanding System", In Proceedings of IEEE Workshop on Automatic Speech Recognition and Understanding, Dec. 2003, 6 pages.
Hemming, Cecilia, "Using Neural Networks in Linguistic Resources", Jan. 5, 2003, located at: http://hemming.se/gslt/LingRes/nnHmg.pdf, 11 pgs.
Hemphill, et al., "The ATIS Spoken Language Systems Pilot Corpus", In Proceedings of the DARPA Speech and Natural Language Workshop, Jun. 1990, 6 pages.
Hinton, et al., "A Fast Learning Algorithm for Deep Belief Nets", In Journal of Neural Computation, vol. 18, Issue 7, Jul. 2006, 16 pages.
Hinton, et al., "Deep Neural Networks for Acoustic Modeling in Speech Recognition", In Journal of IEEE Signal Processing Magazine, vol. 29, Issue 6, Nov. 2012, 16 pages.

(56) References Cited

OTHER PUBLICATIONS

Hinton, et al., "Improving Neural Networks by Preventing Co-Adaptation of Feature Detectors", In Proceedings of Preprint arXiv:1207.0580, Jul. 3, 2012, 18 pages.
Hinton, Geoffrey E., "Training Products of Experts by Minimizing Contrastive Divergence", In Journal of Neural Computation, vol. 14, Issue 8, Aug. 2002, 30 pages.
Hwang, S. H. et al., "Neural-network-based FO text-to-speech synthesizer for Mandarin", Dec. 1994, IEEE Proceedings in Vision, Image and Signal Processing, vol. 141, Issue 6, 7 pgs.
Jordan, Micheal I., "Serial Order: A Parallel Distributed Processing Approach", In Technical Report 8604, Institute for Cognitive Science, University of California, May 1986, 46 pages.
Karaali, Orhan et al., "High quality text-to-speech system composed of multiple neural networks", May 1998, Proceedings in IEEE International Conference on Acoustics, Speech and Signal Processing, 4 pgs.
Kudo, et al., "Chunking with Support Vector Machines", In Proceedings of the Second Meeting of the North American Chapter of the Association for Computational Linguistics on Language Technologies, Jun. 2, 2001, 8 pages.
Kudo, Taku, "CRF++: Yet Another CRF Toolkit", Retrieved on: May 27, 2013, Available at: http://crfpp.googlecode.com/svn/trunk/doc/index.html, 11 pgs.
Lafferty, et al., "Conditional Random Fields: Probabilistic Models for Segmenting and Labeling Sequence Data", In Proceedings of the Eighteenth International Conference on Machine Learning, Jun. 28, 2001, 8 pages.
Le, et al., "Structured Output Layer Neural Network Language Model", In Proceedings of IEEE International Conference on Acoustics, Speech and Signal Processing, May 22, 2011, 4 pages.
Liu, et al., "A Conversational Movie Search System Based on Conditional Random Fields", In Proceedings of 13th Annual Conference of the International Speech Communication Association, Sep. 9, 2012, 4 pages.
Maaten, et al., "Visualizing Data using t-SNE", In Journal of Machine Learning Research, vol. 9, Nov. 2008, 27 pages.
Macherey, et al., "Natural Language Understanding Using Statistical Machine Translation", In Proceedings of 7th European Conference on Speech Communication and Technology, Sep. 3, 2011, 4 pages.
Mesnil, et al., "Investigation of Recurrent-Neural-Network Architectures and Learning Methods for Spoken Language Understanding", In INTERSPEECH, Aug. 2013, 5 pages.
Mikolov, "RNNLM Toolkit", Retrieved on: May 27, 2013, Available at: http://www.fit.vutbr.cz/~imikolov/rnnlm/, 3 pgs.
Mikolov, et al., "Context Dependent Recurrent Neural Network Language Model", In Proceedings of IEEE on Spoken Language Technology Workshop, Dec. 2, 2012, 6 pages.
Mikolov, et al., "Empirical Evaluation and Combination of Advanced Language Modeling Techniques", In Proceedings of 12th Annual Conference of the International Speech Communication Association, Aug. 28, 2011, 4 pages.
Mikolov, et al., "Extensions of Recurrent Neural Network Language Model", In Proceedings of IEEE International Conference on Acoustics, Speech and Signal Processing, May 22, 2011, 4 pages.
Mikolov, et al., "Linguistic Regularities in Continuous Space Word Representations", In Proceedings of the Conference of the North American Chapter of the Association for Computational Linguistics: Human Language Technologies, May 27, 2013, 6 pages.
Mikolov, et al., "Recurrent Neural Network Based Language Model", In Proceedings of 11th Annual Conference of the International Speech Communication Association, Sep. 26, 2010, 4 pages.
Mikolov, et al., "Strategies for Training Large Scale Neural Network Language Models", In Proceedings of IEEE Workshop on Automatic Speech Recognition and Understanding, Dec. 11, 2011, 6 pages.
Miller, Scott et al., "Hidden Understanding Models of Natural Language", in Proceedings on the 32nd Annual Meeting on Association for Computational Linguistics, located at: http://acl.ldc.upenn.edu/P/P94/P94-1004.pdf, 8 pgs.
Mnih, et al., "A Scalable Hierarchical Distributed Language Model", In Proceedings of Advances in Neural Information Processing Systems, vol. 21, Dec. 8, 2008, 8 pages.
Mohamed, et al., "Investigations of Full-Sequence Training of Deep Belief Networks for Speech Recognition ", In Proceeding of 11th Annual Conference of the International Speech Communication Association, Sep. 26, 2010, 4 pages.
Mori, Renato De, "Spoken Language Understanding: A Survey", In Proceedings of IEEE Workshop on Automatic Speech Recognition & Understanding, Dec. 9, 2007, 12 pages.
Morin, et al., "Hierarchical Probabilistic Neural Network Language Model", In Proceedings of the 10th International Workshop on Artificial Intelligence and Statistics, Jan. 6, 2005, 7 pages.
Moschitti, et al., "Spoken Language Understanding with Kernels for Syntactic/Semantic Structures", In Proceedings of IEEE Workshop on Automatic Speech Recognition & Understanding, Dec. 9, 2007, 6 pages.
Peng, et al., "Conditional Neural Fields", In Proceedings of Neural Information Processing Systems, Dec. 2009, 9 pages.
Perez-Ortiz, Juan Antonio et al., "Part-of-Speech Tagging with Recurrent Neural Networks", University of Alacant, Spain, 2001, 5 pgs.
Pieraccini, Roberto et al., "A Speech Understanding System Based on Statistical Representation of Semantics", Mar. 23, 1992, in Proceedings of the IEEE International Conference on Acoustics, Speech and Signal Processing, vol. 1, located at: http://ieeexplore.ieee.org/stamp/stamp.jsp?tp=&arnumber=225939, 4 pgs.
Price, P. J., "Evaluation of Spoken Language Systems: The ATIS Domain", In Proceedings of the Workshop on Speech and Natural Language, located at: http://acl.idc.upenn.edu/H/H90/H90-1020.pdf, Jun. 24, 1990, 5 pages.
Raymond, et al., "Generative and Discriminative Algorithms for Spoken Language Understanding", In Proceedings of 8th Annual Conference of the International Speech Communication Association, Aug. 27, 2007, 4 pages.
Rumelhart, et al., "Learning Internal Representations by Error Propagation", In Proceedings of Book-Parallel Distributed Processing: Explorations in the Microstructure of Cognition, vol. 1, Jul. 1986, 45 pages.
Salatas, John, "Letter to Phoneme Conversion in CMU Sphinx-4: Literature review", May 17, 2012, located at: http://cmusphinx.sourceforge.net/2012/05/letter-to-phoneme-conversion-in-cmu-sphinx-4-literature-review/, 4 pgs.
Sarikaya, et al., "Deep Belief Nets for Natural Language Call-Routing", In Proceedings of IEEE International Conference on Acoustics, Speech and Signal Processing, May 22, 2011, 4 pages.
Schuster, et al., "Bidirectional Recurrent Neural Networks", In Journal of IEEE Transactions on Signal Processing, vol. 45, Issue 11, Nov. 1997, 9 pages.
Schwenk, et al., "Connectionist Language Modeling for Large Vocabulary Continuous Speech Recognition", In Proceedings of IEEE International Conference on Acoustics, Speech, and Signal Processing, vol. 1, May 13, 2002, 4 pages.
Schwenk, et al., "Continuous Space Language Models for Statistical Machine Translation", In Proceedings of the COLING/ACL, Jul. 2006, 8 pages.
Schwenk, et al., "Large, Pruned or Continuous Space Language Models on a GPU for Statistical Machine Translation", In Proceedings of the NAACL-HLT Workshop: Will We Ever Really Replace the N-gram Model? On the Future of Language Modeling for HLT, Jun. 8, 2012, 9 pages.
Schwenk, et al., "Training Neural Network Language Models on Very Large Corpora", In Proceedings of the Conference on Human Language Technology and Empirical Methods in Natural Language Processing, Oct. 2005, 8 pages.
Schwenk, Holger, "Continuous Space Language Models", In Journal of Computer Speech and Language, vol. 21, Issue 3, Jul. 2007, 27 pages.
Seide, et al., "Feature Engineering in Context-Dependent Deep Neural Networks for Conversational Speech Transcription", In

(56) References Cited

OTHER PUBLICATIONS

Proceedings of IEEE Workshop on Automatic Speech Recognition and Understanding, Dec. 11, 2011, 6 pages.
Seneff, Stephanie, "TINA: A Natural Language System for Spoken Language Applications", In Journal of Association for Computational Linguistics, vol. 18, Issue 1, Mar. 1992, 26 pages.
Shetty, et al., "Handwritten Word Recognition using Conditional Random Fields", In Ninth International Conference on Document Analysis and Recognition, Sep. 23, 2007, 5 pages.
Socher, et al., "Learning Continuous Phrase Representations and Syntactic Parsing with Recursive Neural Networks", In Proceedings of 28th International Conference on Machine Learning, Jun. 28, 2011, 9 pages.
Son, et al., "Measuring the Influence of Long Range Dependencies with Neural Network Language Models", In Proceedings of the NAACL-HLT Workshop: Will We Ever Really Replace the N-gram Model? On the Future of Language Modeling for HLT, Jun. 8, 2012, 10 pages.
Tri Do, et al., "Neural Conditional Random Fields", In Proceedings of the 13th International Artificial Intelligence and Statistics, May 13, 2010, 8 pages.
Trmal, Jan, "Spatio-Temporal Structure of Feature Vectors in Neural Network Adaptation", Proceedings in Habilitation and Dissertation Theses, located at: http://www.kky.zcu.cz/cs/publications/1/JanTrmal_2012_Spatio-temporal.pdf, 133 pgs.
Tur, et al., "Towards Deeper Understanding Deep Convex Networks for Semantic Utterance Classification", In Proceedings of IEEE International Conference on Acoustics, Speech and Signal Processing, Mar. 25, 2012, 4 pages.
Tur, et al., "What is Left to be Understood in ATIS?", In Proceedings of IEEE Workshop on Spoken Language Technology, Dec. 12, 2010, 6 pages.
Tur, Gokhan et al., "Sentence Simplification for Spoken Language Understanding", May 22, 2011, In Proceedings of IEEE International Conference on Acoustics, Speech and Signal Processing, located at: http://ieeexplore.ieee.org/stamp/stamp.jsp?tp=&arnumber=5947636, 4 pgs.
Turian, et al., "Word Representations: A Simple and General Method for Semi-Supervised Learning", In Proceedings of the 48th Annual Meeting of the Association for Computational Linguistics, Jul. 11, 2010, 11 pages.
Wang, et al., "Combining Statistical and Knowledge-based Spoken Language Understanding in Conditional Models", In Proceedings of the COLING/ACL on Main Conference Poster Sessions, Jul. 2006, 8 pages.
Wang, et al., "Discriminative Models for Spoken Language Understanding", In Proceedings of International Conference on Spoken Language Processing, Sep. 17, 2006, 4 pages.
Wang, et al., "Spoken Language Understanding—An Introduction to the Statistical Framework", In Journal of IEEE Signal Processing Magazine, vol. 22, Issue 5, Sep. 2005, 16 pages.
Ward, et al., "Recent Improvements in the CMU Spoken Language Understanding System", In Proceedings of the Workshop on Human Language Technology, Mar. 8, 1994, 4 pages.
Ward, Wayne, "The CMU Air Travel Information Service: Understanding Spontaneous Speech", In Proceedings of the Workshop on Speech and Natural Language, Jun. 1990, 3 pages.
Wermter, Stefan et al., "SCREEN: Learning a Flat Syntactic and Semantic Spoken Language Analysis Using Artificial Neural Networks", Proceedings in Journal of Artificial Intelligence Research, Jan. 1997, located at: http://www.informatik-uni-hamburg.de/WTM/os/jair97.pdf, 51 pgs.
Xu, et al., "Convolutional Neural Network Based Triangular CRF for Joint Intent Detection and Slot Filling", Retrieved on: Nov. 25, 2013, Available at: http://research.microsoft.com/pubs/204706/joint_cnn.pdf, 6 pgs.
Yaman, et al., "An Integrative and Discriminative Technique for Spoken Utterance Classification", In Journal of IEEE Transactions on Audio, Speech, and Language Processing, vol. 16, Issue 6, Aug. 2008, 8 pages.
Yao, Kaisheng et al., "Recurrent Neural Networks for Language Understanding", In Proceedings of Conference of Interspeech, Aug. 25, 2013, 5 pgs.
Yu, et al., "Feature Learning in Deep Neural Networks—Studies on Speech Recognition Tasks", In Proceedings of International Conference on Learning Representations, May 2, 2013, 9 pages.
Zue, et al., "Conversational Interfaces: Advances and Challenges", In Proceedings of the IEEE, vol. 88, Issue 8, Aug. 2000, 15 pages.
U.S. Appl. No. 14/016,186, Amendment and Response filed Nov. 18, 2015, 21 pgs.
U.S. Appl. No. 14/016,186, Office Action dated Jan. 25, 2016, 31 pgs.
U.S. Appl. No. 14/303,934, Office Action dated Nov. 6, 2015, 12 pgs.
Bilcu, E, B, et al., "Recurrent neural network with both side input context dependence for text-to-phoneme mapping", Control, Communications and Signal Processing, 2004, First Internation Al Symposium on Hammamet, Tunisia, Mar. 21-24, 2004, Piscataway, NJ, USA, IEEE, pp. 599-602.
Bilcu, E. B. et al., "A study on different neural network architectures applied to text-to-phoneme mapping", Image and Signal Processing and Analysis, 2003, ISPA 2003, Proceedings of the 3rd International Symposium on Rome, Italy, Sep. 18-20, 2003, Piscataway, NJ, USA, IEEE, Zagreb, Croatia, vol. 2, 18, Sep. 18, 2003, pp. 892-896.
PCT International Search Report and Written Opinion in International Application PCT/US2015/034993, dated Aug. 17, 2015, 13 pgs.
U.S. Appl. No. 14/016,186, Office Action dated May 18, 2015, 29 pgs.
U.S. Appl. No. 14/201,670, Notice of Allowance dated Sep. 14, 2015, 9 pgs.
J.A. Perez-Ortiz et al, Part-of-speech tagging with recurrent neural networks, IJCNN '01, International Joint Conference on Neural Networks. Proceedings (CAT. No. 01CH37222), vol. 3, Jan. 1, 2001, pp. 1588-1592.
Mansour Sheikhan, "Generation of suprasegmental information for speech using a recurrent neural network and binary gravitational search algorithm for feature selection", Applied Intelligence, vol. 40, No. 4, Jan. 12, 2014, pp. 772-790.
PCT International Search Report and Written Opinion in International Application PCT/US2015/035504, dated Sep. 18, 2015, 14 pgs.
Yeh C-Y et al, "Efficient text analyser with prosody generator-driven approach for Mandarin text-to-speech—General articles", IEE Proceedings: Vision, Image and Signal Processing, Institution of Electrical Engineers, GB, vol. 152, No. 6, Dec. 9, 2005, pp. 793-799.
U.S. Appl. No. 14/303,934, Office Action dated Apr. 13, 2016, 13 pages.
U.S. Appl. No. 14/303,934, Amendment and Response filed Feb. 18, 2016, 11 pages.
PCT Second Written Opinion in PCT/US2015/034993, dated May 30, 2016, 6 pages.
PCT Second Written Opinion in PCT/US2015/035504, dated Jun. 2, 2016, 7 pages.
Graves, Alex, "Generating Sequences With Recurrent Neural Networks", Apr. 8, 2013, at: http://arxiv.org.pdf.1308.0850v1.pdf, 43 pgs.
U.S. Appl. No. 14/016,186, Amendment and Response filed Jul. 12, 2016, 22 pgs.
U.S. Appl. No. 14/303,934, Amendment and Response filed Aug. 4, 2016, 15 pages.
U.S. Appl. No. 14/303,934, Office Action dated Aug. 26, 2016, 18 pages.
U.S. Appl. No. 14/016,186, Office Action dated Sep. 8, 2016, 24 pgs.
Garfield, Sheila et al., "Call classification using recurrent neural networks, support vector machines and finite state automata", Knowledge and Information systems, 2006, pp. 131-156.
PCT International Preliminary Report on Patentability in Application PCT/US2015/034993, dated Aug. 26, 2016, 9 pgs.
PCT International Preliminary Report on Patentability in Application PCT/US2015/035504, dated Aug. 26, 2016, 9 pgs.

(56) References Cited

OTHER PUBLICATIONS

U.S. Appl. No. 14/016,186, Amendment and Response filed Feb. 8, 2017, 22 pgs.
U.S. Appl. No. 14/016,186, Office Action dated Mar. 17, 2017, 27 pgs.

* cited by examiner

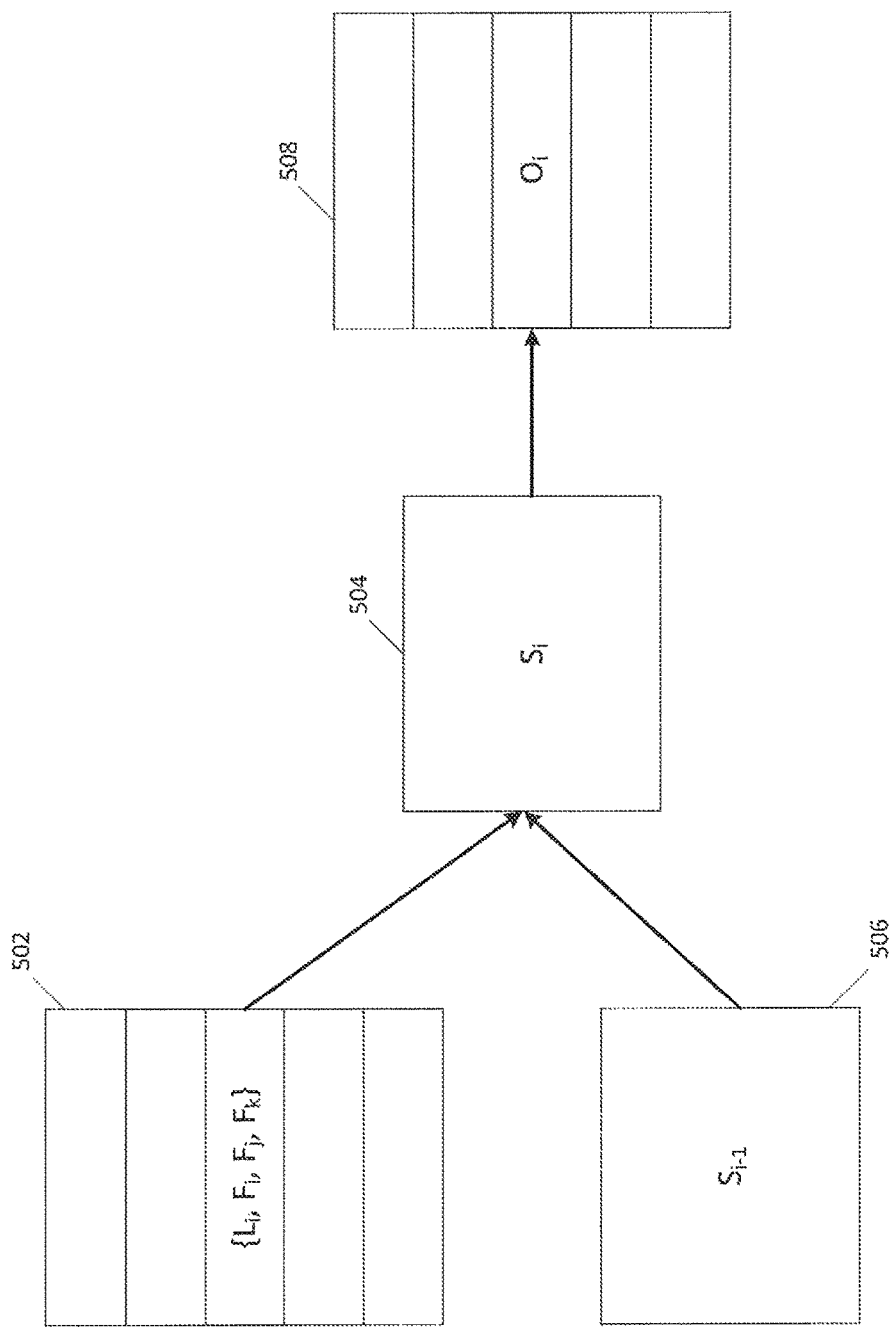

HYPER-STRUCTURE RECURRENT NEURAL NETWORKS FOR TEXT-TO-SPEECH

BACKGROUND

Text-to-speech applications are utilized to read written text aloud. Such applications may assist people with poor eyesight, people who are in a position where reading the text is undesired, such as driving in a car, and people who may just prefer to hear text read aloud rather than having to read the text. In situations where text is read aloud to the user, the user often wants to hear a voice that sounds more natural and accurately reads the text.

It is with respect to these and other general considerations that embodiments have been made. Also, although relatively specific problems have been discussed, it should be understood that the embodiments should not be limited to solving the specific problems identified in the background.

SUMMARY

In one aspect, the technology relates to a method for converting text to speech. The method includes receiving text input and receiving two or more properties from a group consisting of part-of-speech properties, phonemes, linguistic prosody properties, contextual properties, and semantic properties. The two or more phonetic properties are determined by a recurrent neural network (RNN) module. The method also includes determining phonetic properties for the text input based on the received two or more properties and generating a generation sequence. In one embodiment, the two or more properties received are the part-of-speech properties and phonemes. In another embodiment, the two or more properties received are the linguistic prosody properties, the contextual properties, and the semantic properties. In yet another embodiment, the two or more properties received are the phonemes, the contextual properties, and the semantic properties. In still another embodiment, the method also includes optimizing the generation sequence.

In another embodiment, the method includes synthesizing the generation sequence into audible speech. In yet another embodiment, the two or more properties are received as a dense auxiliary input. In still another embodiment, determining phonetic properties for the text input is determined utilizing a recurrent neural network. In another embodiment, the two or more properties are received by a hidden layer and an output layer of the recurrent neural network.

In another aspect, the technology relates to A computer storage device, having computer-executable instructions that, when executed by at least one processor, perform a method for converting text-to-speech. The method includes receiving text input and receiving two or more properties from a group consisting of part-of-speech properties, phonemes, linguistic prosody properties, contextual properties, and semantic properties. The two or more phonetic properties are determined by a recurrent neural network (RNN) module. The method also includes determining phonetic properties for the text input based on the received two or more properties and generating a generation sequence. In one embodiment, the two or more properties received are the part-of-speech properties and phonemes. In another embodiment, the two or more properties received are the phonemes, the contextual properties, and the semantic properties. In yet another embodiment, the method also includes optimizing the generation sequence. In still another embodiment, the method also includes synthesizing the generation sequence into audible speech.

In another embodiment, the two or more properties are received as a dense auxiliary input. In yet another embodiment, the text input and the two are more properties are received as a dense auxiliary input. In still another embodiment, determining phonetic properties for the text input is determined utilizing a recurrent neural network. In another embodiment, the two or more properties are received by a hidden layer and an output layer of the recurrent neural network.

In yet another aspect, the technology relates to a system for converting text to speech. The system includes at least one processor and memory encoding computer executable instructions that, when executed by at least one processor, perform a method for converting text to speech. The method includes receiving text input and receiving two or more properties from the group consisting of: part-of-speech properties, phonemes, linguistic prosody properties, contextual properties, and semantic properties. The two or more properties are determined by a recurrent neural network module. The method also includes determining phonetic properties for the text input based on the received two or more properties. The method also includes generating a generation sequence, wherein generating the generation sequence utilizes a unified recurrent neural network decoder.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

FIG. 5A depicts another architecture of an RNN, according to an example embodiment.

DETAILED DESCRIPTION

Figure 1:
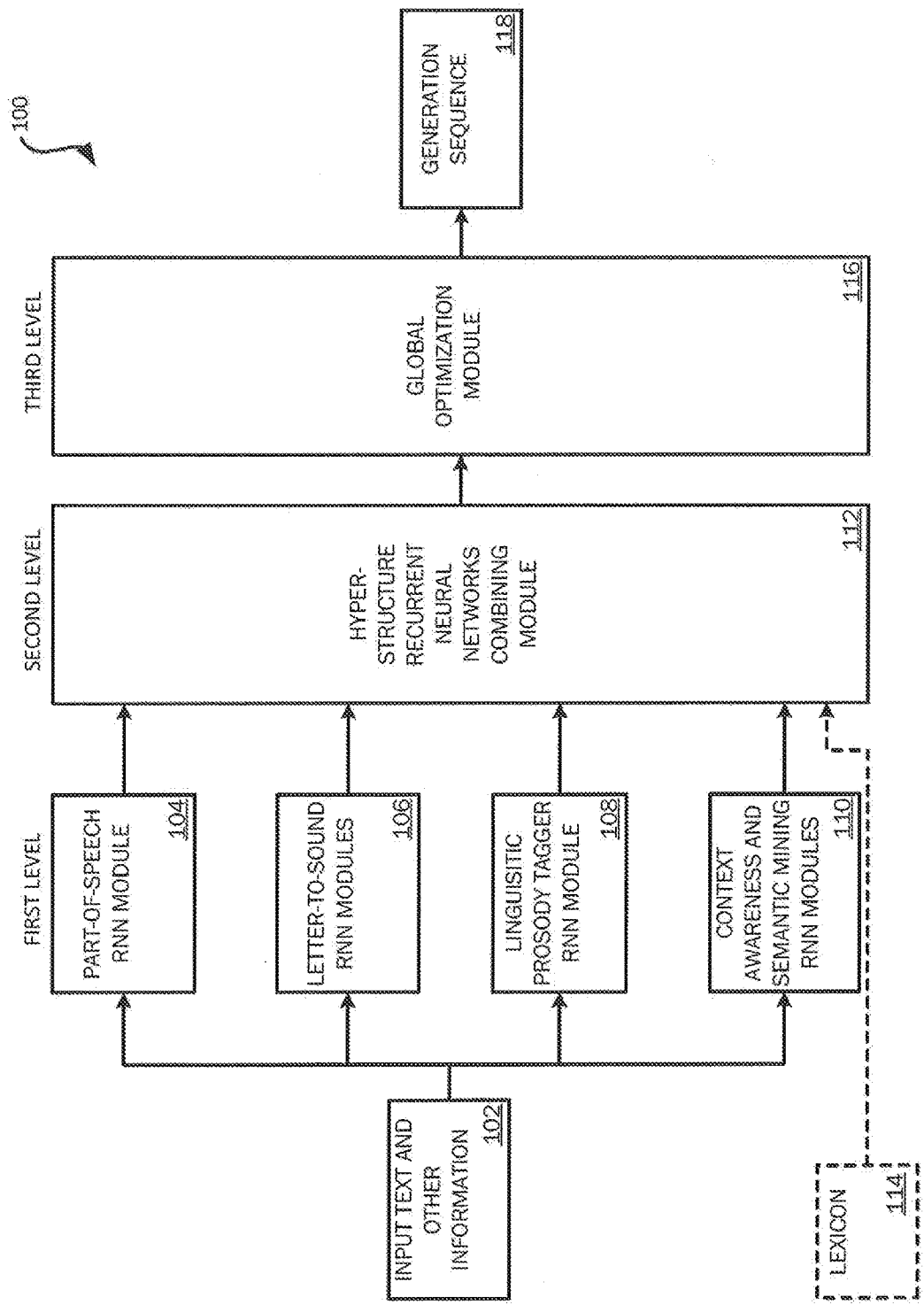
FIG. 1 illustrates a system for converting text to speech, according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

The present disclosure generally relates to converting text to speech. Conventionally, text-to-speech applications are performed by using methods based on look-up-tables and decision trees, such as Classification and Regression Trees (CART). These prior methods, however, suffer from many disadvantages. For example, CART based text-to-speech often has difficulty determining pronunciations, and the conventional text-to-speech methods lack context awareness when converting the text-to-speech. Additionally, the prior methods, such as cascading tagger modules, accumulate errors as they cascade. Further, with the prior methods, including additional context or feature information would have resulted in large increase in computing costs.

To improve text-to-speech applications, recurrent neural networks (RNN) may be utilized. RNNs have the benefit of being able to handle additional features and side information without data fragmentation. The RNNs also provide better performance at the same time. In embodiments of the present application, multiple RNN modules are utilized to convert text to speech. The modules may be considered to be in three levels. In the first level, RNN modules are used to model and predict rich phonetic property tags from various scales of text input. The phonetic properties may be used to determine the best pronunciation for the text and the most natural sounding speech resulting from the text-to-speech conversion. For example, in embodiments, RNN modules for assigning part-of-speech information and linguistic prosody information to the text are utilized.

Another RNN module may be used to determine phonemes from letters of words, as a part of letter-to-sound (LTS) conversion. LTS conversion is useful for determining the pronunciation of all words, but it may be especially useful for words that are out of vocabulary, or not otherwise known. The LTS conversion with an RNN module may also enhance pronunciation with syllable stress levels. By using an RNN module for LTS, phonemes may be determined for text by analyzing the text itself and the text surrounding the text that it is analyzed. The phonemes may also be determined in part based on contextual or semantic information regarding the text being analyzed.

Another RNN module in the first level may be used to determine the contextual information and/or the semantic information for the input text. In some embodiments, the context and semantic information may include emotional style, dialogue state or style, time of day, application state, personality type such as extroversion or introversion, and acoustic environment, among other types of contextual and semantic information. The context and/or semantic information may provide insight into how the word should be pronounced or the tone or style in which it should be spoken. For example, in analyzing the sentence, "The angry lady said: 'go away'", an emotional style of "angry" may be assigned to the words 'go away' from the text. This contextual information may then be utilized creating a generation sequence in synthesizing the speech.

The text inputs to the RNN modules in the first level may be of different scales depending on the RNN module. For example, the different input scales include the letter index in each word, the word index in the sentence, the sentence index in dialogue, or the dialogue index.

At a second level of analysis, a hyper-structure module may be used to combine the outputs from the first level of RNN modules. The hyper-structure module may be another RNN module. The hyper-structure module selects the optimal phonetic properties determined by the RNN modules in the first level, based on the outputs from each of those RNN modules. From the determined optimal phonetic properties, the hyper-structure module creates a generation sequence that may be used by a speech synthesizer to produce audible speech. The hyper-structure may also assign additional phonetic properties to the text. While one goal of the hyper-structure is to improve the accuracy of the generation sequence, an additional goal is to create the best sequence possible, which might not always be the most accurate sequence. The best sequence, rather, is one that maximizes the mean opinion score (MOS) for the user in the user's context and in the application's context.

At a third level of analysis, the generation sequence from the hyper-structure module may be further optimized by a global optimization module. The global optimization module implements a set of special rules that may not have been accounted for in the previous levels of analysis. The global optimization module may optimize the generation sequence as a whole or individual segments of the generation sequence. The global optimization module outputs an optimized generation sequence for speech synthesis into audible speech.

FIG. 1 depicts a system with a framework 100 for a hyper-structure recurrent neural networks text-to-speech application. In the embodiment depicted, framework 100 includes, in a first level, a part-of-speech (POS) RNN module 104, letter-to-sound (LTS) RNN modules 106, linguistic prosody tagger RNN module 108, and context awareness and semantic mining RNN modules 110. Each of the modules receives input 102 from text and, in some embodiments, other information. Outputs from the POS RNN module 104, LTS RNN modules 106, linguistic prosody tagger RNN module 108, and context awareness and semantic mining RNN modules 110 are fed into a hyper-structure recurrent neural networks combining module 112. Outputs from the hyper-structure recurrent neural networks combining module 112 may also be fed into a global optimization module 116, which ultimately outputs an optimized generation sequence 118 to be utilized by a speech synthesizer to read the text aloud via a speaker or other output device.

POS RNN module 104 utilizes an RNN to determine the part of speech of a word from the input text 102. The POS receives text from the input 102 in the form of multiple words, such as sentences. From the input words, the trained RNN determines a proper tag for the part-of-speech of one or more of the words from the input 102. For example, the word may be tagged on a large scale as a verb, noun, adjective, adverb, pronoun, preposition, conjunction, or interjection. The word may also be given more detailed tags, such as tenses of words like present tense, present indicative, present subjunctive, future, imperfective past, perfective past, relative past, and relative future. Other detailed tags may relate to whether the word is plural or singular or whether the type of part-of-speech, such as a transitive or lexical verb. The part-of-speech tags provide an additional indicator of the proper pronunciation of the word. For example, in the sentence "I bought a record," the word "record" would be tagged as a noun. In natural speech, the noun "record" is pronounced differently from the verb "record."

The tag for each word is determined from the trained POS RNN module 104 processing the word itself and the other words around it, such as both the words in front of the target word and the words behind the target word. In some embodiments, only the words in front of the target word may be analyzed, and in other embodiments, only the words behind the target word may be analyzed. The input may be in the form of sentences and/or paragraphs, such that the analysis is capable of determining the part of speech for a target word. A more detailed description of RNN structures is discussed below with reference to FIGS. 2-4.

The LTS RNN modules 106 are another one of the modules in text-to-speech processing. One of the benefits of utilizing an LTS RNN module 106 is to more accurately determine pronunciations for words that are uncommon or not in a vocabulary of words known by the system. The LTS RNN may include one or more modules for converting letters-to-sound. For example, one module may be for a particular language, while another module may be for another language. In some embodiments, a single multi-lingual module may be implemented as LTS RNN module 106. Multi-lingual LTS modules incorporate the different patterns and rules associated with the languages. In language dependent LTS modules, the language being spoken must often be determined. With RNN-based LTS models, multiple languages may be handled by implementing LTS RNN module 106 as a combined RNN model, which allows for the same RNN decoder to be used for the language identification and the generation of phonemes. In embodiments, a unified RNN model trainer may be used to train the multi-lingual LTS module. The LTS RNN module 106 receives input as multiple letters, such as the letters that form a word. The LTS RNN module 106 processes the input letters to determine the phonemes for the letters and words. In other words, the LTS RNN module 106 converts the letters to corresponding phonemes that can then be synthesized into audible speech. For example, in an embodiment, the letters in the word "activesync" may be converting to phonemes "ael k t ih v s ihl ng k".

The phoneme for each letter or grouping of letters is determined from the trained LTS RNN module 106 that processes a target letter itself as well as the letters around the target letter, such as the letters in from of the target letter and the letters behind the target letter. In some embodiments, only the letters in front of the target letter may be analyzed, and in other embodiments, only the letters behind the target word may be analyzed. The input may be in the form of words, such that the analysis is capable of determining how the letters around the target letter affect pronunciation. A reverse-back modeling may be used where the letters of the word are analyzed in reverse order. A more detailed description of RNN structures is discussed below with reference to FIG. 2-4.

The linguistic prosody tagger (LPT) RNN module 108 determines linguistic prosody properties for letters, words, or groups of words from the input 102. Generally, linguistic prosody properties are properties that indicate the rhythm and sound used in speech. Some prosody properties include the pitch contour, the duration of time to read the text, the volume at which to read the text, the pitch or frequency at which to read the text, the stress of the word or syllable, and the frequency range at which to read the text, among others. After determining the appropriate linguistic prosody property, the prosody tagger RNN module 108 tags the target text with the linguistic prosody property.

The prosody tag for the targeted text is determined from the trained prosody tagger RNN module 104 processing the target text itself and the other text around it, such as both the text in front of the target text and the text behind the target word. In some embodiments, only the text in front of the target text may be analyzed, and in other embodiments, only the text behind the target text may be analyzed. The input may be in the form of sentences and/or paragraphs, such that the analysis is capable of determining the part of speech for the target text. The target text may be a single word, a letter of a word, or a group of words, such as a sentence, paragraph, or dialogue. A more detailed description of RNN structures is discussed below with reference to FIGS. 2-4.

The context awareness and semantic mining RNN modules 110 are yet another aspect of determining the most natural pronunciation of text in text-to-speech applications. The context awareness and semantic mining RNN modules 110 determines contextual information relating to the input text 102. Examples of the contextual information include emotional style, dialogue state, time of day, application state, and acoustic environment, among other types of contextual information. Upon determining the contextual information, the target text is tagged with the determined contextual information. The context awareness and semantic mining RNN modules 110 may include multiple RNN modules for each different type of contextual information. In other embodiments, the context awareness and semantic mining RNN modules 110 includes a single RNN module capable of determining multiple types of contextual information.

The context tag for the text is determined from the trained context awareness and semantic mining RNN modules 110 processing the text itself and the other text around it, such as both the text in front of the target text and the text behind the target word. In some embodiments, only the text in front of the text may be analyzed, and in other embodiments, only the text behind the text may be analyzed. The input may be in the form of sentences and/or paragraphs, such that the analysis is capable of determining the part of speech for the target text. The input text may be in the form of a single word, a letter of a word, or a group of words, such as a sentence, paragraph, or dialogue. A more detailed description of RNN structures is discussed below with reference to FIGS. 2-4.

In some embodiments, some of the contextual information and/or contextual tags are provided with the input text 102 as additional information. In such embodiments, the context awareness and semantic mining RNN modules 110 may only contain functionality for the context information not included at the input. In similar embodiments, a determination may be made prior to processing the input text 102 to determine what additional context information is included with the input text 102. Based on the determination, the text may not be processed by some of the context awareness and semantic mining RNN modules 110 if the corresponding contextual information is already included in the input.

The outputs, such as tags and phonemes, from the context awareness and semantic mining RNN modules 110, the linguistic prosody tagger RNN module 108, the LTS RNN modules 106, and the POS RNN module 104, is received by the hyper-structure recurrent neural networks combining module 112. The hyper-structure recurrent neural networks combining module 112 processes the inputs to determine whether any of the inputs may need to be adjusted or modified based on the other inputs. For instance, based on the contextual information tag for a text segment, the linguistic prosody tag may need to be modified. Each of the different inputs may have an effect on one another and the hyper-structure recurrent neural networks combining module 112 processes those inputs to account for those effects. The hyper-structure recurrent neural networks combining module 112 may also determine additional phonetic properties and property types that were not determined by the modules in the first level. After processing the inputs from the other RNN modules, the hyper-structure recurrent neural networks combining module 112 produces a generation sequence. The generation sequence is capable of being utilized by a speech synthesizer to generate audible speech. The generation sequence may indicate how the text should be spoken and synthesized into audible speech. In some embodiments, the output of the hyper-structure recurrent neural networks combining module 112 is in the same form as the inputs of the hyper-structure recurrent neural networks combining module 112, but the values for the data may be different. In other embodiments, the output may be a code string indicating the phonetic properties to be synthesized.

As shown in FIG. 1, an optional lexicon 114 may be included as input to the hyper-structure RNN combining module 112 or any of the other modules. The lexicon 114 may be a conventional lexicon utilized in conventional text-to-speech inputs. The lexicon 114 may also be absorbed into the RNN models as training data, and therefore there is no need for the separate input, such as in a look-up table.

In the embodiment depicted in FIG. 1, the output of the hyper-structure recurrent neural networks combining module 112 is received by the global optimization module 116. The global optimization module 116 processes the output of the hyper-structure recurrent neural networks combining module 112 to further refine the phonetic properties of the text to be synthesized. For instance, there are types of text input 102 that may be subject to special rules that are not accounted for by the hyper-structure recurrent neural networks combining module 112 or the context awareness and semantic mining RNN modules 110, the linguistic prosody tagger RNN module 108, the LTS RNN modules 106, and the POS RNN module 104. The special rules may include idiosyncratic rules or applications that are best handled by the global optimization module 116 rather than the other modules. For example, some of the special rules may include rules for abbreviations and pronunciations for proper nouns. For example, in the sentence "MS was founded by Bill Gates and Paul Allen," a special rule may be used to indicate that "MS" should be pronounced as "Microsoft." The global optimization module 116 may also be utilized with a golden set of pronunciations for a set of words, sentences, paragraphs, and the like. For instance, the sentence "MS was founded by Bill Gates and Paul Allen" may be included in the golden set. The global optimization module 116 may also process the data, if necessary, to put the data in the proper form of a generation sequence.

The output of the global optimization module is a generation sequence that may be utilized an audio synthesizer to generate the synthesized speech corresponding the input text 102. Because the generation sequence is the combination of multiple phonetic properties and details regarding the input text 102, the synthesized audio will sound more natural to the user.

Figure 2:
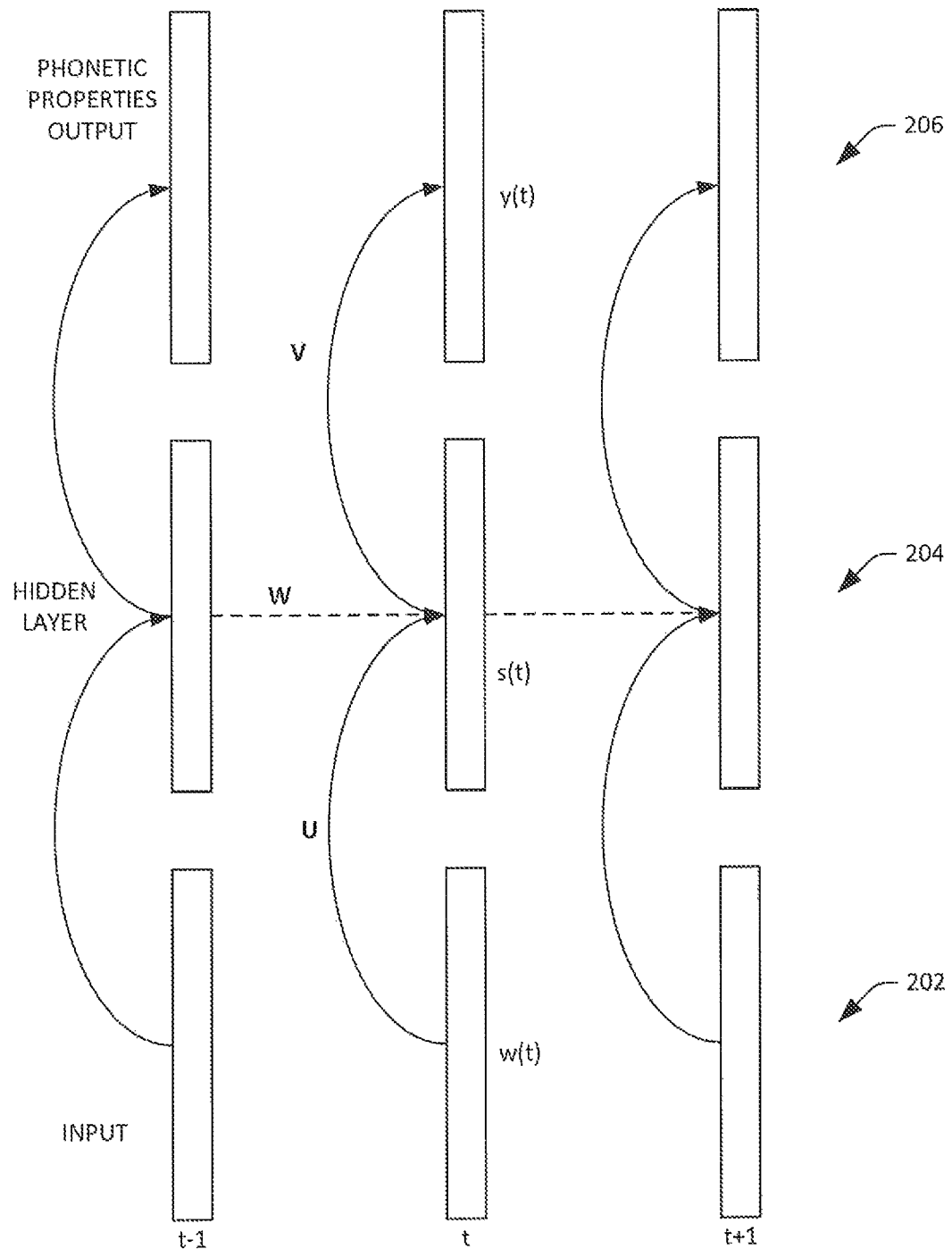
FIG. 2 depicts an architecture of an RNN, according to an example embodiment.

FIG. 2 depicts an architecture of an RNN that may be utilized in the context awareness and semantic mining RNN modules 110, the linguistic prosody tagger RNN module 108, the LTS RNN modules 106, the POS RNN module 104, and the hyper-structure recurrent neural networks combining module 112. An exemplary architecture of the RNN is shown in FIG. 2. In the architecture set forth in FIG. 2, the RNN is shown as being "unrolled" across time to cover three consecutive word inputs. The RNN comprises an input layer 202 at the "bottom" of the RNN, a hidden layer 204 in the middle with recurrent connections (shown as dashed lines), and an output layer 206 at the top of the RNN. Each layer represents a respective set of nodes, and the layers are connected with weights denoted by the matrices U, W, and V. For instance, in one embodiment, the hidden layer may contain 800 nodes. The input layer (vector) w(t) represents an input word at time t encoded using 1-of-N coding (also called "one-hot coding"), and the output layer y(t) produces a probability distribution over phonetic properties that are assignable to the input text. The hidden layer 204 s(t) maintains a representation of the text sequence history. The input vector w(t) has a dimensionality equal to the vocabulary size, and the output vector y(t) has a dimensionality equal to the number of possible assignable phonetic properties. The values in the hidden and output layers are computed as follows:

$$s(t)=f(Uw(t)+Ws(t-1)), \quad (1)$$

$$y(t)=g(Vs(t)). \quad (2)$$

where $$f(z) = \frac{1}{1+e^{-z}}, \quad g(z_m) = \frac{e^{z_m}}{\Sigma_k e^{z_k}}. \quad (3)$$

The model can be trained using standard back propagation to maximize the data conditional likelihood, as follows:

$$\Pi_t P(y(t)|w(1), \ldots, w(t)) \quad (4)$$

Other training methods for RNNs may be utilized as well.

It can be noted that this model has no direct interdependence between output values. Rather, the probability distribution is a function of the hidden layer activations, which in turn depend on the word inputs (and their own past values). Further, a decision on y(t) can be made without reaching an end of the word sequence (sentence). As such, the likeliest sequence of phonetic properties can be output with a series of decisions:

$$y^*(t)=\arg \max P((y(t)|w(1) \ldots (w(t)) \quad (5)$$

This capability provides the further advantage of being able to be performed simply and online. In embodiments, it is unnecessary to do a dynamic programming search over phonetic properties to find the optimum.

Figure 3:
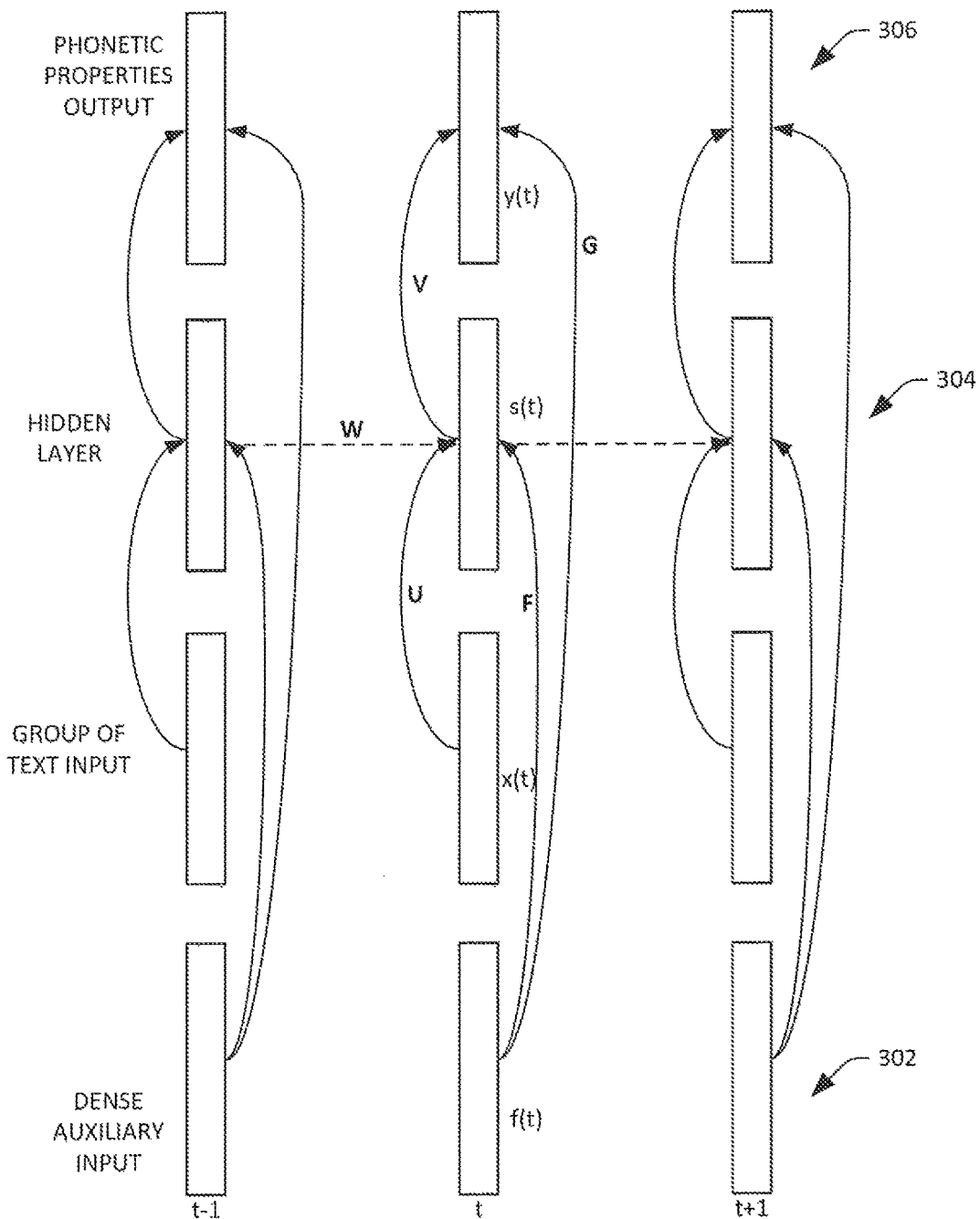
FIG. 3 depicts another architecture of an RNN, according to an example embodiment.

Another architecture of an RNN is illustrated in FIG. 3. As it is desirable to identify a likeliest phonetic property sequence for text in the sequence of text given all text in such sequence, "future" text may be desirably employed as input when determining the semantic label for word w(t). Two exemplary approaches are described herein for doing so. First, the input layer of the RNN may be changed from a "one-hot" representation to an "n-hot" or group-of-text representation, in which there is a non-zero value for not just the current text, but the next n−1 text as well. As such, future words may be considered during the analysis. An advantage of this approach is using greater context, but a potential disadvantage is that ordering information may be lost.

The second exemplary approach for including future text is exemplified in the architecture shown in FIG. 3, which illustrates a "feature-augmented" architecture. In such approach, side information is provided by way of an extra layer 302 of dense (as opposed to "one-hot") inputs f(t) with connection weights F to a hidden layer 304 and G to an output layer 306. Continuous space vector representations of future text may be provided as input to the hidden layer 304. In an exemplary embodiment, the representation of text may be learned by a non-augmented network (which may comprise weights from the input layer to the hidden layer). To retain text ordering information, representations may be concatenated in sequence in a given context window. Training and decoding procedures are otherwise unaltered.

In the architecture of FIG. 3, the activation computation can be modified as follows:

$$s(t)=f(Ux(t)+Ws(t-1)+Ff(t)), \quad (6)$$

$$y(t)=g(Vs(t)+Gf(t)), \quad (7)$$

where x(t) can be either w(t) or a group-of-text vector. For instance, x(t)={w(t), w(t+1)} and comprises the current text and the next or future text, forming a "2-hot" representation.

Figure 4:
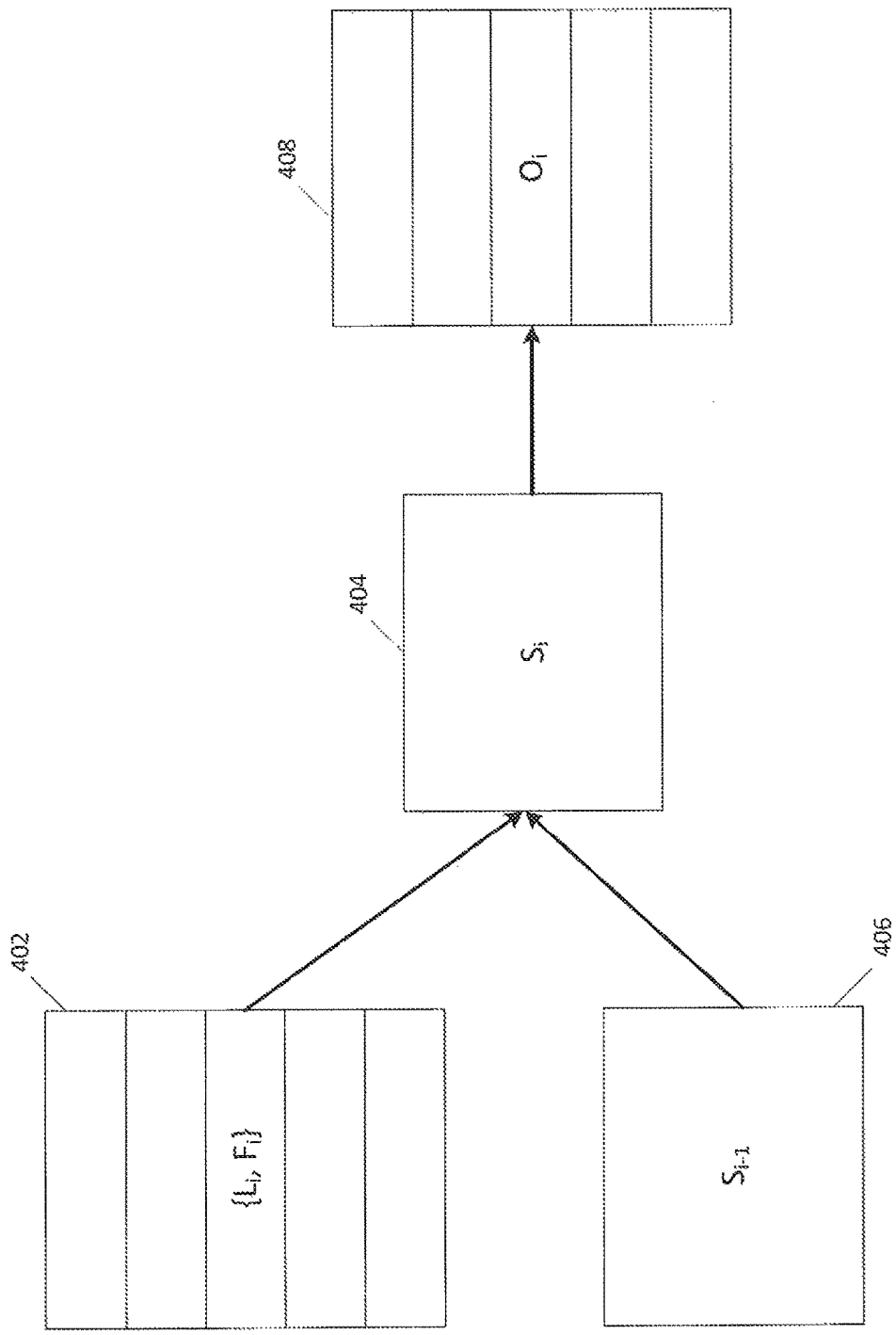
FIG. 4 depicts another architecture of an RNN, according to an example embodiment.

FIG. 4 illustrates another depiction of a high level architecture for an RNN suitable for use in the context awareness and semantic mining RNN modules 110, the linguistic prosody tagger RNN module 108, the LTS RNN modules 106, and the POS RNN module 104. The input feature {$L_i$, $F_i$} 402 for the RNN includes the current module feature {L} and the auxiliary feature {F} from other model's outputs. The subscript i denotes the sequential index for the letter index in each word, the word index in each sentence, the sentence index in the dialogue, and/or the dialog index, depending on the module or embodiment. The state S from the hidden layer 404 in the RNN architecture is used to record the history information for the sequence. The state S for the current index is then returned into the RNN for the next index in the sequence, as shown by the $S_{i-1}$ input 406 and as discussed above with reference to FIGS. 2-3. Based on the inputs, the RNN determines an output 408 for each index of the input sequence.

FIG. 5A illustrates a depiction of an RNN for use as the hyper-structure RNN combining module 112. In some embodiments, the RNN depicted in FIG. 5 may also be utilized in the context awareness and semantic mining RNN modules 110, the linguistic prosody tagger RNN module 108, the LTS RNN modules 106, and the POS RNN module 104. The input feature {$L_i$, $F_i$, $F_j$, $F_k$} 502 for the RNN includes the current module feature {L} and the auxiliary feature {F} from other model's outputs. The auxiliary feature {F} may include the current auxiliary feature on the same scale of the input, denoted as $F_i$. The auxiliary feature {F} may also include higher scale auxiliary features, denoted as $F_j$. The subscript i denotes the sequential index for the letter index in each word, the word index in each sentence, the sentence index in the dialogue, and/or the dialog index, depending on the module or embodiment. The subscript j similarly denotes a higher scale sequential index than the current index. The $F_j$ features may come from the output of the other RNN modules, such as the context awareness and semantic mining RNN modules 110, the linguistic prosody tagger RNN module 108, the LTS RNN modules 106, and the POS RNN module 104. For example, on the letter scale RNN modeling for LTS, higher scale tags, such as word, sentence, and dialogue scale tags, may be utilized as auxiliary features $F_j$. As another example, for sentence scale RNN modeling to determine emotional states or personality types, the auxiliary features $F_j$ may be auxiliary features may be dialogue scale features. For dialogue scale RNN modeling for personality or other semantic mining tags, the $F_j$ features may be environment states.

The auxiliary feature {F} may further include auxiliary features on a smaller scale, denoted as $F_k$. The subscript k denotes a smaller scale sequential index than the current index, i. The $F_k$ features may come from the output of the other RNN modules, such as the context awareness and semantic mining RNN modules 110, the linguistic prosody tagger RNN module 108, the LTS RNN modules 106, and the POS RNN module 104.

The state S from the hidden layer 504 in the RNN architecture is used to record the history information for the sequence. The state S for the current index is then returned into the RNN for the next index in the sequence, as shown by the $S_{i-1}$ input 506 and as discussed above with reference to FIGS. 2-3. Based on the inputs, the RNN determines an output 508 for each index level of the input sequence.

For the LTS RNN module 106, the input text into the RNN is in the form of letters in a word. Each index, i, in the sequence denotes an individual letter in a word. The output from the LTS RNN module 106 is a sequence of phonemes for the letters of the words. The auxiliary features for the LTS RNN module 106 may include features indicating the context of the letters or the words formed by the letters. In some embodiments, the auxiliary features are on the same scale as the letters or on a higher scale, such as the word, sentence, or dialogue scale.

For example, for the word "hot," the letter "h" may be considered $L_0$. The letter "o" would be $L_1$, and "t" would be $L_2$. In that example, the letter "h" is processed in the hidden layer and the encoded history of that processing is represented as $S_0$. Based on the processing, the output of the phoneme corresponding to "h" is output as $O_0$. The processing of the letter "h" may also be based on the future letters, "o" and "t". The future letters may be input into the RNN as part of a feature vector. The letter "o", input as $L_1$, is processed in the hidden layer and the encoded history of that processing is represented as $S_1$. The processing may be based on the history of the letters previously analyzed, encoded as $S_0$, and the future letters. By analyzing the future letters in determining the phoneme for the letter "o", it can be determined that the letter "o" in the word "hot" should be assigned a phoneme corresponding to the short o sound, rather than the long o sound, as in the word "hole." Based on that processing, an output of the phoneme corresponding to "o" is output as $O_1$. The final letter in the word, "t", then processed. The history of the letters in the word is encoded as $S_1$, and an output of the phoneme is corresponding to the letter "t" is output as $O_2$. The amount of history encoded in S may be adjusted to limit the number of prior letters that may be taken into consideration. The number of future letters considered may also be limited to a predetermined number of future letters.

The LTS RNN module may also perform reverse-back analysis to process the letters in a word in a reverse order. In other words, the letters in the suffix are analyzed prior to the letters in the root of the word or in the prefix of the word. Using the above example, for the word "hot," the letter "h" may be considered $L_0$, the letter "o" would be $L_1$, and "h"

would be $L_2$. By performing the reverse analysis, the phoneme output of the above example may be confirmed. The reverse analysis may also be used as a primary analysis to produce phonemes corresponding to the letters of the words.

For some languages, the reverse-back analysis may provide more accurate results than the prior methods, such as using a CART-tree decision analysis. The following table summarizes results from an experiment testing the RNN technology against a baseline of a CART-tree analysis. The experiment was with same-letter phonemes by the unified evaluation script on en-US (with stress) setup. The training set was 195,080 words, the test set was 21,678 words, and the results were based on natural phone sequences (no compound phonemes or empty phonemes).

| LTS Process | Word Error Rate | Phoneme Error Rate |
| --- | --- | --- |
| Baseline (CART Tree) | 44.15% | 8.36% |
| RNN (Reverse-Back, 700 hidden state) | 42.26% | 7.09% |

From the results, the RNN process provides a 4.28% relative improvement over the word error rate, and a 15.19% relative improvement over the phoneme error rate.

As an example, for the POS RNN module 104, the input text into the RNN is words of a sentence. Each index, i, in the sequence denotes an individual word in a sentence. The output from the POS is a tag for each of the words in the sentence indicating the part of speech for the word. In some cases, the tag may be null if there is no associated or known POS tag for a word. The auxiliary features in the POS RNN module 104 may include features indicating the context of the word. For example, words may be previously tagged (via other RNN modules or other tagging methods) with contextual information. For example, the word "Boston" may have been previously tagged as a city. Including this information as auxiliary information may further influence the POS tag by the POS RNN module 104. Other previously determined contextual information on the same scale or on other scales may also be included as input to the POS RNN module 104. Future words may also be analyzed similar to the letters in the LTS RNN module 106.

For the linguistic prosody tagger RNN module 108, the input text into the RNN is in the form of words in a sentence. Each index, i, in the sequence denotes an individual word in the sentence. The output from the linguistic prosody tagger RNN module 108 is linguistic prosody tags for the words of the sentence. In other embodiments, the input text to the linguistic prosody tagger RNN module 108, the input text into the RNN is in the form of sentences in a dialogue, or a dialogue itself. In those embodiments, each index, i, denotes an individual sentence in a dialogue, or a dialogue itself, respectively. The auxiliary features in the linguistic prosody tagger RNN module 108 may include features indicating the context of the word. For example, words may be previously tagged (via other RNN modules or other tagging methods) with contextual information. Other previously determined contextual information on the same scale or on other scales may also be included as input to the linguistic prosody tagger RNN module 108. Future words may also be analyzed similar to the letters in the LTS RNN module 106.

For the context awareness and semantic mining RNN module 110, the input text is in the form of words in a sentence, sentences in a dialogue, or a dialogue itself. Each index, i, in the sequence denotes a word in a sentence, a sentence in a dialogue, or a dialogue itself, respectively. The context awareness and semantic mining RNN module 110 outputs contextual properties for the text, such as emotional style, dialogue state, time of day, application state, acoustic environment, etc. The auxiliary features for the context awareness and semantic mining RNN module 110 may include features indicating the context of the words, sentences, or dialogues that is previously known before the input text is processed by the context awareness and semantic mining RNN module 110.

The hyper-structure recurrent neural networks combing module 112 receives the inputs and outputs of the context awareness and semantic mining RNN modules 110, the linguistic prosody tagger RNN module 108, the LTS RNN modules 106, and the POS RNN module 104. As such, the input text {L} may be on multiple scales. The hyper-structure recurrent neural networks combing module 112 receives the outputs from the modules in the first level as auxiliary features {F}. Those auxiliary features may be on the same scale as the text being analyzed, or it may be on a different scale that the current scale of the text being analyzed. From the inputs, the hyper-structure recurrent neural networks combing module 112 determines the optimal phonetic properties and tags associated with the text. In embodiments, the hyper-structure recurrent neural networks combing module 112 determines the same phonetic properties that were determined by the modules in the first level, but the hyper-structure recurrent neural networks combing module 112 is able to determine the optimal phonetic properties based on all the determined phonetic properties from the modules in the first level.

Figure 5B:
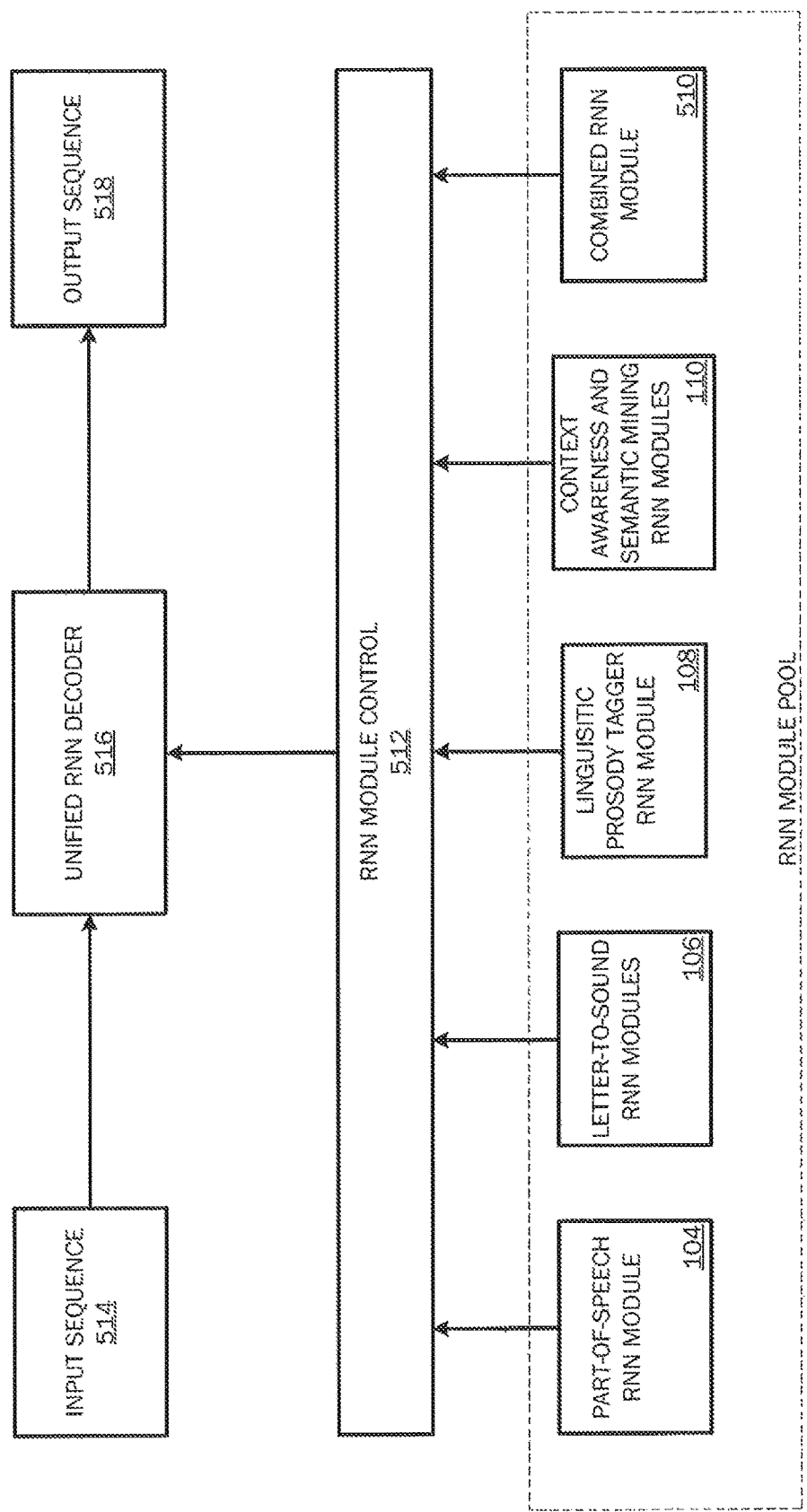
FIG. 5B depicts an embodiment of an RNN-based system that may be implemented for text-to-speech.

FIG. 5B depicts an embodiment of an RNN-based system that may be implemented for TTS. As depicted in FIG. 5B, the outputs of the RNN modules discussed above with reference to FIG. 1 are received by an RNN module control 512. Additionally, other RNN modules may be utilized, or a combined RNN module 510 that combines the functionalities of other modules may also be utilized. The RNN module control 512 may process the data received from the modules in the RNN module pool so that the output from the RNN module control 512 is usable by a unified RNN decoder 516. The unified RNN decoder 516 receives an input sequence 514 and outputs and output sequence 518 based on the functionalities of the RNN modules in the RNN module pool. As such, the unified RNN decoder unifies the RNN module functionalities into a decoder.

FIGS. 6-10 illustrate methodologies relating to assigning phonetic properties to text. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 6:
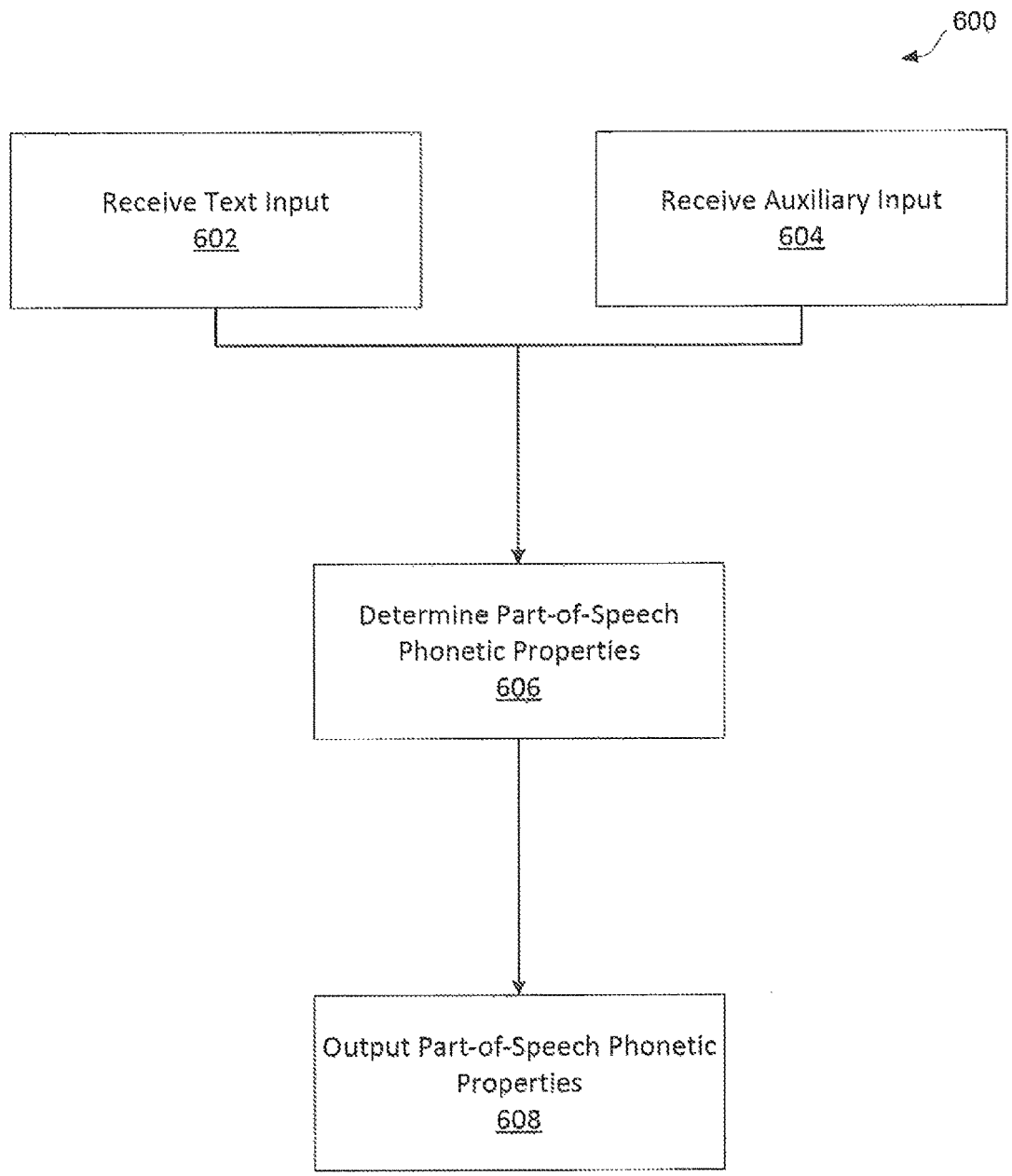
FIG. 6 depicts a method for determining the part-of-speech for text utilizing an RNN, according to an example embodiment.

FIG. 6 depicts a method 600 for determining the part-of-speech for text utilizing an RNN. At operation 602, text input is received. The text input may be received in the form of words in a sentence. The words may also be received as a group-of-text representation or bag-of-words representation. At operation 604, auxiliary input is received. The auxiliary information may include contextual and/or semantic information about the input text. The auxiliary information may also include the current text and the future text. In such embodiments where all the input text is included as a dense auxiliary input, the separate text input at operation 602 may be unnecessary.

At operation 606, part-of-speech phonetic properties for the text is determined utilizing an RNN. For example, the POS RNN module 104 may determine the part-of-speech phonetic properties for the text. At operation 608, the determined part-of-speech phonetic properties are assigned to the text, and the assigned phonetic properties are outputted.

Figure 7:
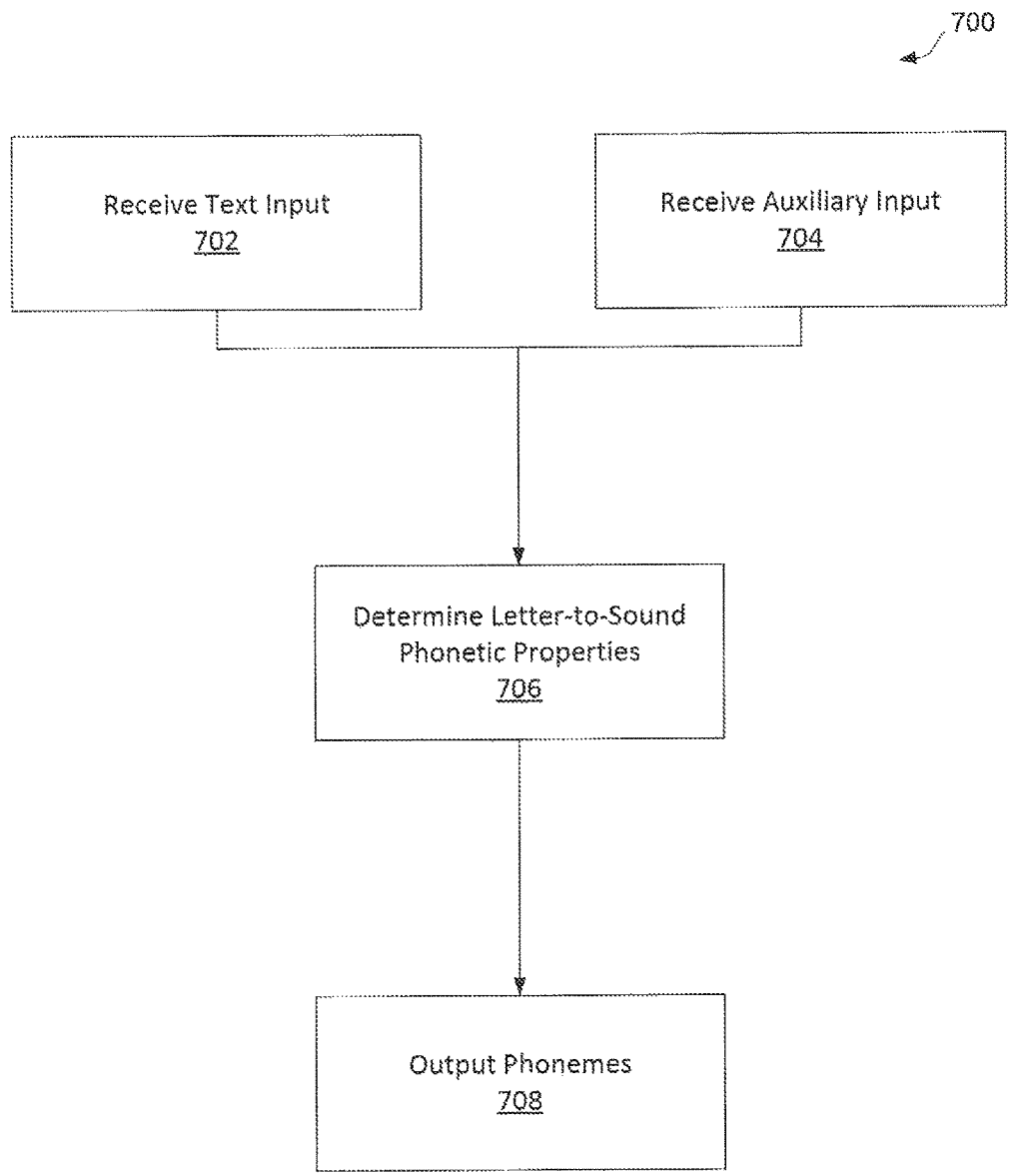
FIG. 7 depicts a method for determining phonemes for text utilizing an RNN, according to an example embodiment.

FIG. 7 depicts a method 700 for determining phonemes for text utilizing an RNN. At operation 702, text input is received. The text input may be received in the form of letters in a word. The letters may also be received as a group-of-text representation. At operation 704, auxiliary input is received. The auxiliary information may include contextual and/or semantic information about the input text. The auxiliary information may also include the current text and the future text. In such embodiments where all the input text is included as a dense auxiliary input, the separate text input at operation 702 may be unnecessary.

At operation 706, letter-to-sound phonetic properties, such as phonemes, for the text is determined utilizing an RNN. For example, the LTS RNN modules 106 may determine the phonemes for the text. At operation 708, the determined phonemes are assigned to the text, and the assigned phonemes are outputted.

Figure 8:
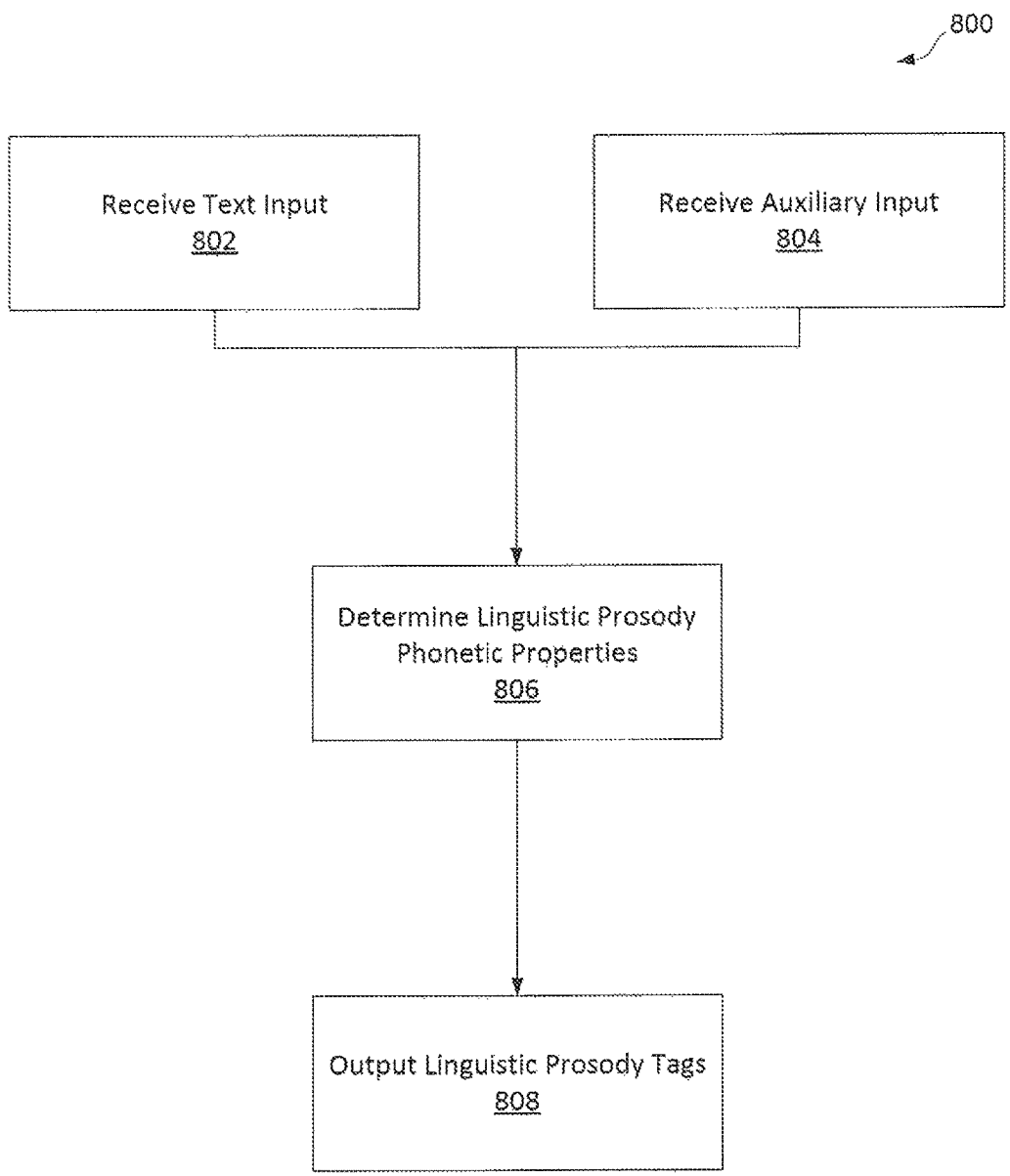
FIG. 8 depicts a method for determining linguistic prosody phonetic properties, or linguistic prosody tags, for text utilizing an RNN, according to an example embodiment.

FIG. 8 depicts a method 800 for determining linguistic prosody phonetic properties, or linguistic prosody tags, for text utilizing an RNN. At operation 802, text input is received. The text input may be received in the form of words in a sentence, sentences in a dialogue, or a dialogue. The text may also be received as a group-of-text representation or bag-of-words representation. At operation 804, auxiliary input is received. The auxiliary information may include contextual and/or semantic information about the input text. The auxiliary information may also include the current text and the future text. In such embodiments where all the input text is included as a dense auxiliary input, the separate text input at operation 802 may be unnecessary.

At operation 806, linguistic prosody phonetic properties, or linguistic prosody tags, for the text are determined utilizing an RNN. For example, the linguistic prosody tagger RNN module 108 may determine the linguistic prosody tags for the text. At operation 808, the determined linguistic prosody tags are assigned to the text, and the assigned linguistic prosody tags are outputted.

Figure 9:
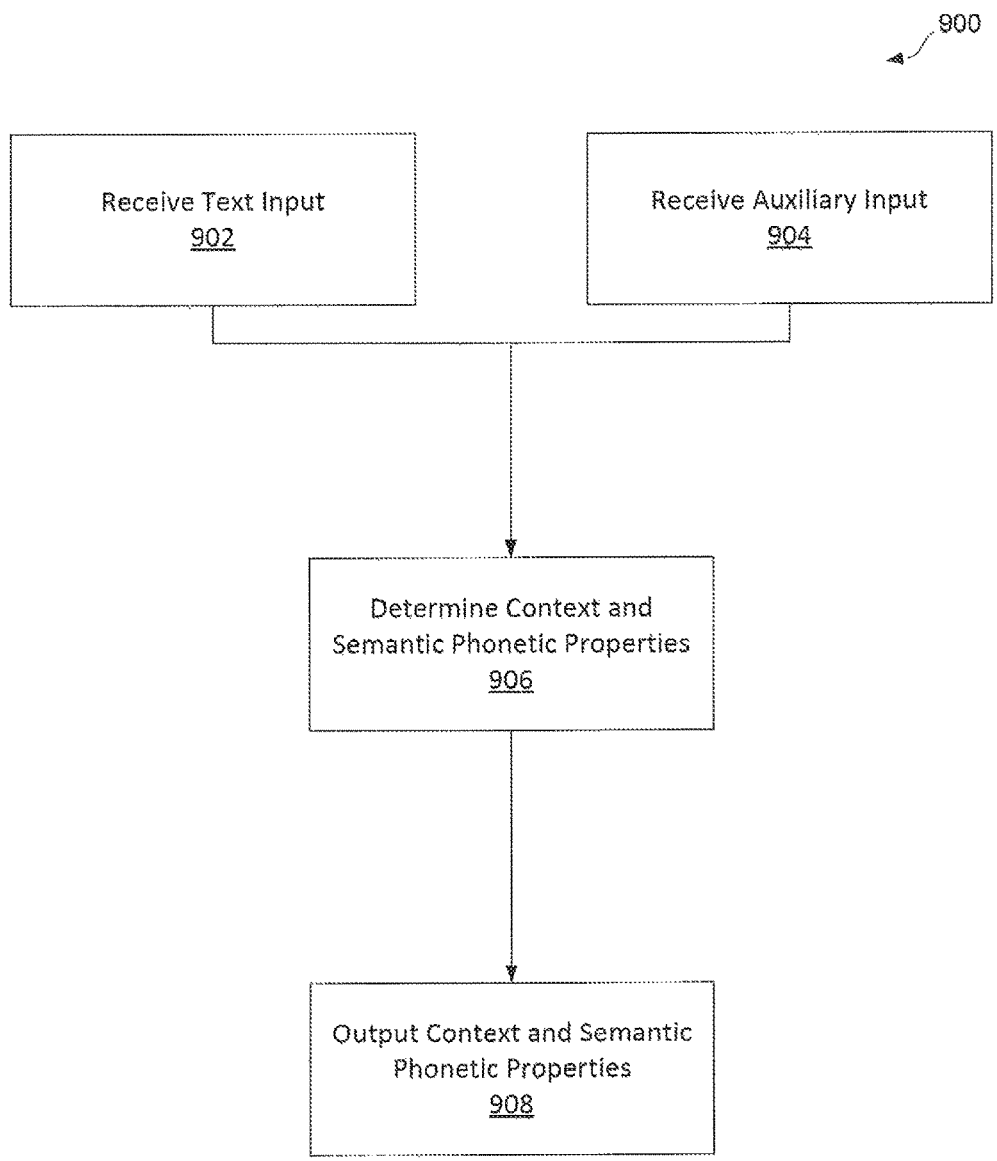
FIG. 9 depicts a method for determining context and/or semantic meaning for text utilizing an RNN, according to an example embodiment.

FIG. 9 depicts a method 900 for determining context and/or semantic meaning for text utilizing an RNN. At operation 902, text input is received. The text input may be received in the form of words in a sentence, sentences in a dialogue, or a dialogue. The text may also be received as a group-of-text representation or bag-of-words representation. At operation 904, auxiliary input is received. The auxiliary information may include contextual and/or semantic information about the input text. The auxiliary information may also include the current text and the future text. In such embodiments where all the input text is included as a dense auxiliary input, the separate text input at operation 902 may be unnecessary.

At operation 906, context and/or semantic meaning for the text are determined utilizing an RNN. For example, context awareness and semantic mining RNN modules 110 may determine the context and/or semantic meaning for the text. At operation 908, the determined context and/or semantic meaning are assigned to the text, and the assigned context and/or semantic meaning are outputted.

Figure 10:
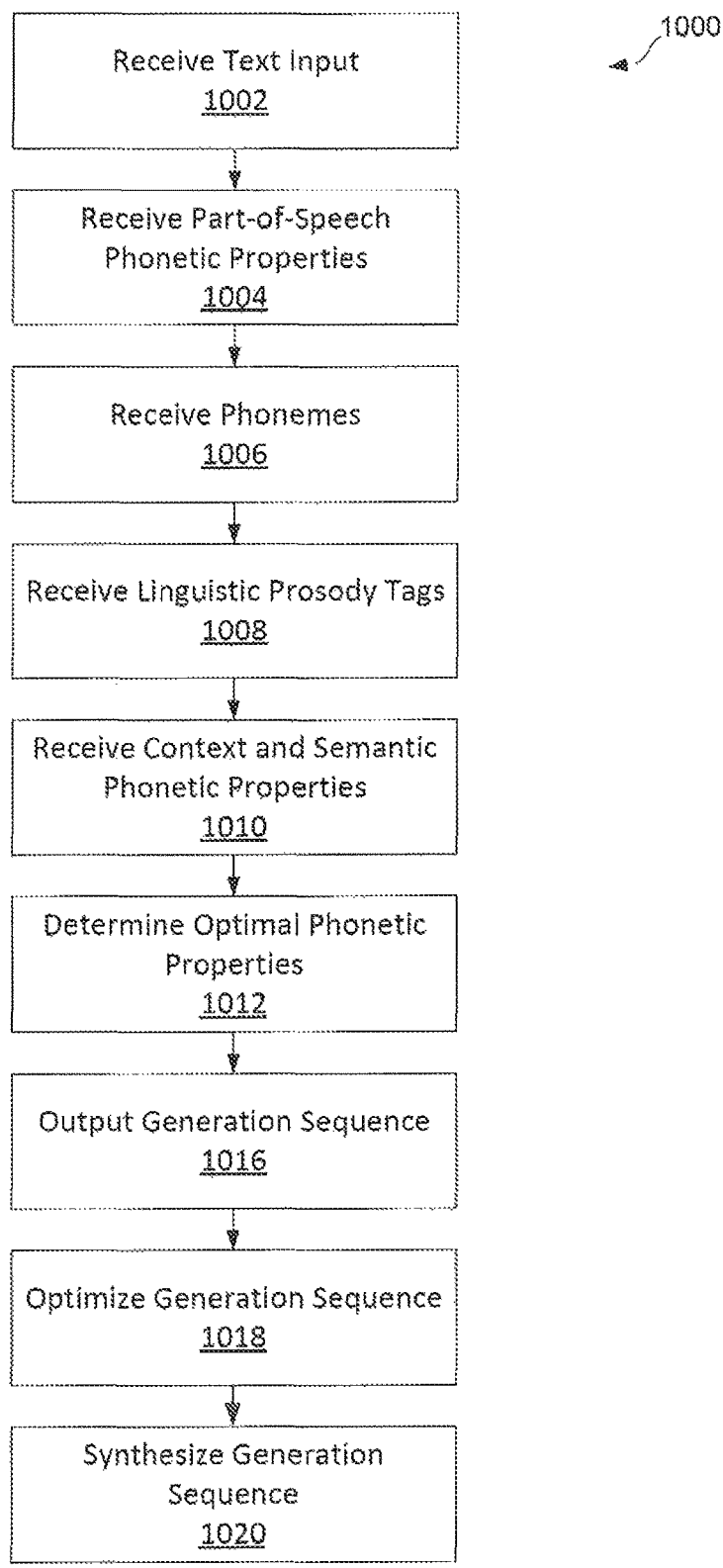
FIG. 10 depicts a method for determining optimal phonetic properties for text, according to an example embodiment.

FIG. 10 depicts a method 1000 for determining optimal phonetic properties for text. At operation 1002, text input is received. In some embodiments, the text input will be received in the same form that the RNN modules in the first level received the text input. For instance, the text input may be received as a group of text or as part of a dense auxiliary input. At operation 1004, part-of-speech phonetic properties are received. The part-of-speech phonetic properties may be those outputted from the POS RNN module 104. At operation 1006, phonemes are received. The phonemes may be those outputted from the LTS RNN modules 106. At operation 1008, linguistic prosody tags are received. The linguistic prosody tags may be those outputted from the linguistic prosody tagger RNN module 108. At operation 1010, context and/or semantic phonetic properties are received. The context and/or semantic phonetic properties may be those outputted from the context awareness and semantic mining RNN modules 110. Each of the phonetic properties, tags, and phonemes may be received as a dense auxiliary input.

Based on the received input, optimal phonetic properties are determined at operation 1012. The phonetic properties determined may be of the same type of phonetic properties that are received. Additional phonetic properties for the text may also be determined. Based on the determined optimal phonetic properties, a generation sequence is generated that is capable of being synthesized into audible speech. The determination of the optimal phonetic properties and the creation of the generation sequence may be performed by the hyper-structure recurrent neural networks combining module 112. At operation 1018, the generation sequence may be optimized. The optimization of the generation sequence may be based on a special set of rules and/or a golden set of data. The optimized generation sequence may then be synthesized into audible speech at operation 1020.

Experiments have resulted in positive results from use of the system disclosed in this application. For example, the following table summarizes results from recent English-based U.S. experiments.

| Item | Relative Improvement vs. Apollo Baseline |
| --- | --- |
| Letter-to-Sound (RNN-LTS), Including Multilingual RNN-LTS modelling. TTS front-end test on en-US vs. product baseline | Positive (RI: 15.19%) |
| Linguistic Prosody (RNN-LPT) TTS front-end test on en-US vs. product baseline | Positive (RI: 20.12%) |
| Speech Prosody (RNN-Prosody Integration with SPS backend) TTS end-end UHRS CMOS test (baseline: Apollo product frontend with Zira_pro SPS backend) | Positive (CMOS: 0.068) |
| Part-Of-Speech (RNN-POS) TTS front-end test on en-US vs. product baseline | Positive (RI: 45.78%) |

In the above results, the "Apollo Baseline" is based on the Apollo TTS product released in 2013. The Apollo product frontend with Zira_pro SPS backend was a particular setup for the experiment. The experiment utilized the frontend of the Apollo TTS product for phoneme sequence generation and used the Zira_pro voice font with Statistic Parameter Synthesizer to generate the speech based on the phoneme sequence. UHRS CMOS refers to the crowdsourcing test by Universal Human Relevance System (UHRS) and scored based on the Comparative Mean Opinion Score/Scale (CMOS).

Additional experiments regarding the linguistic prosody tagging error rate also produce positive results. The following table summarizes those results:

| LPT approaches | Tag Error Rate |
| --- | --- |
| Product Baseline (Rule plus CRF) | 18.24% |
| RNN-LPT (word as the only feature) | 14.57% (Model size is larger than 73,000 KB) |
| Proposed RNN-LPT (POS as the only feature) | 13.34% (Model size is 73 KB) |
| Relative Improvement for proposed RNN-LPT Vs. Product Baseline | 20.12% |

Figure 11:
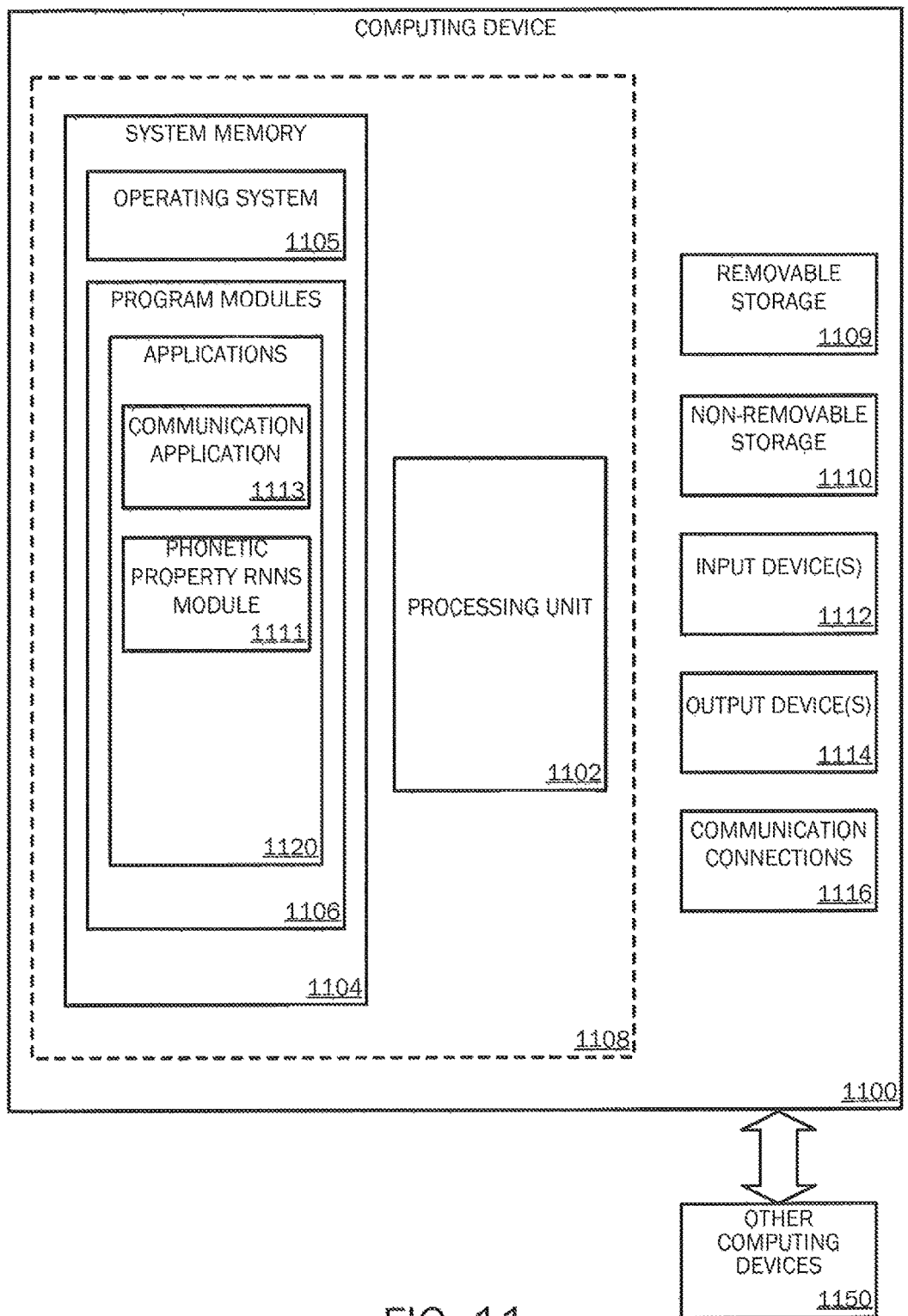
FIG. 11 is a block diagram illustrating example physical components of a computing device with which embodiments of the disclosure may be practiced.

FIG. 11 is a block diagram illustrating physical components (e.g., hardware) of a computing device 1100 with which embodiments of the disclosure may be practiced. The computing device components described below may have computer executable instructions for a communication application 1113, e.g., of a client and/or computer executable instructions for Phonetic property RNNs module 1111, e.g., of a client, that can be executed to employ the methods 400 through 600 disclosed herein. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as determining and assigning phonetic properties as discussed with regard to FIGS. 1-10 and, in particular, communication application 1113 or Phonetic property RNNs module 1111. The operating system 1105, for example, may be suitable for controlling the operation of the computing device 1100. Furthermore, embodiments of the disclosure may be practiced in conjunction with a graphics library, audio library, speech database, speech synthesis applications, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., phonetic property RNNs module 1111 or communication application 1113) may perform processes including, but not limited to, the embodiment, as described herein. Other program modules that may be used in accordance with embodiments of the present disclosure, and in particular to generate screen content and audio content, may include electronic mail and contacts applications, word processing applications, spreadsheet applications, database applications, slide presentation applications, drawing, messaging applications, mapping applications, text-to-speech applications, and/or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12A:
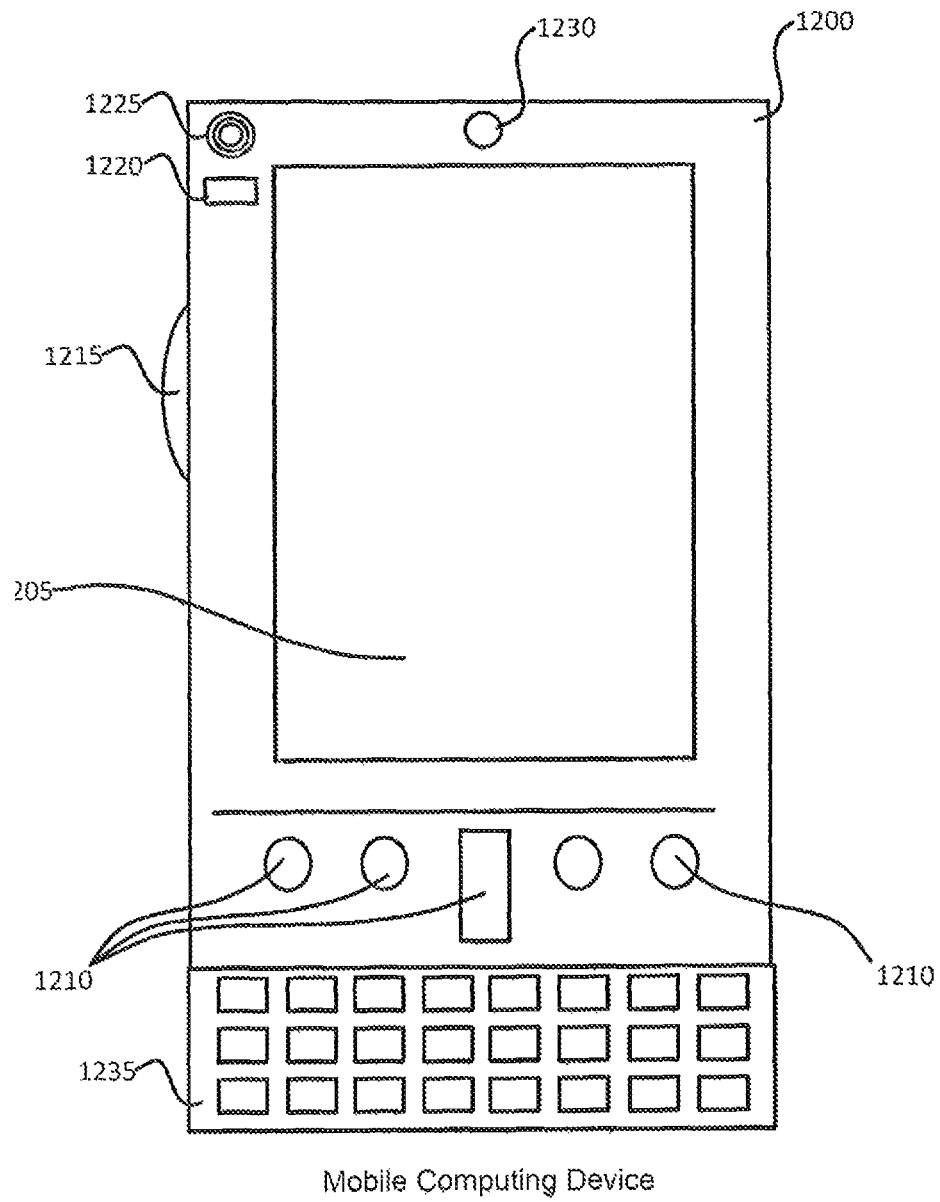
FIGS. 12A and 12B are simplified block diagrams of a mobile computing device with which embodiments of the present disclosure may be practiced.
Figure 12B:
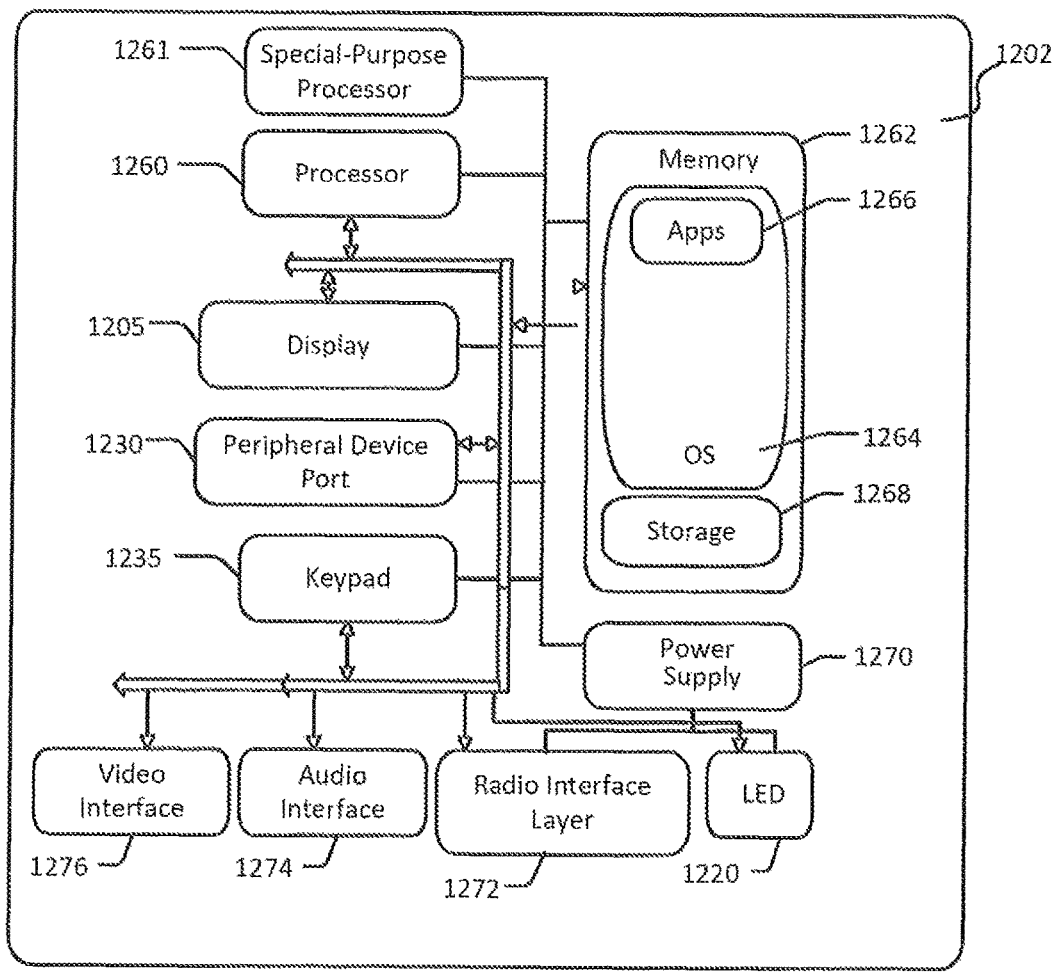

FIGS. 12A and 12B illustrate a mobile computing device 1200, for example, a mobile telephone, a smart phone, wearable computer (such as a smart watch), a tablet computer, a laptop computer, and the like, with which embodiments of the disclosure may be practiced. In some embodiments, the client may be a mobile computing device. With reference to FIG. 12A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one embodiment of a mobile computing device. That is, the mobile computing device 1200 can incorporate a system (e.g., an architecture) 1202 to implement some embodiments. In one embodiment, the system 1202 is implemented as a "smart phone" capable of running one or more applications (e.g., browser, e-mail, calendaring, contact managers, messaging clients, games, text-to-speech applications, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, text-to-speech applications, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the instructions to determine and assign phonetic properties as described herein (e.g., and/or optionally phonetic property RNNs module 1111).

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present disclosure, the microphone may also serve as an audio sensor to facilitate control of notifications, as will be described below. The system 1202 may further include a video interface 1276 that enables an operation of an on-board camera 1230 to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

Figure 13:
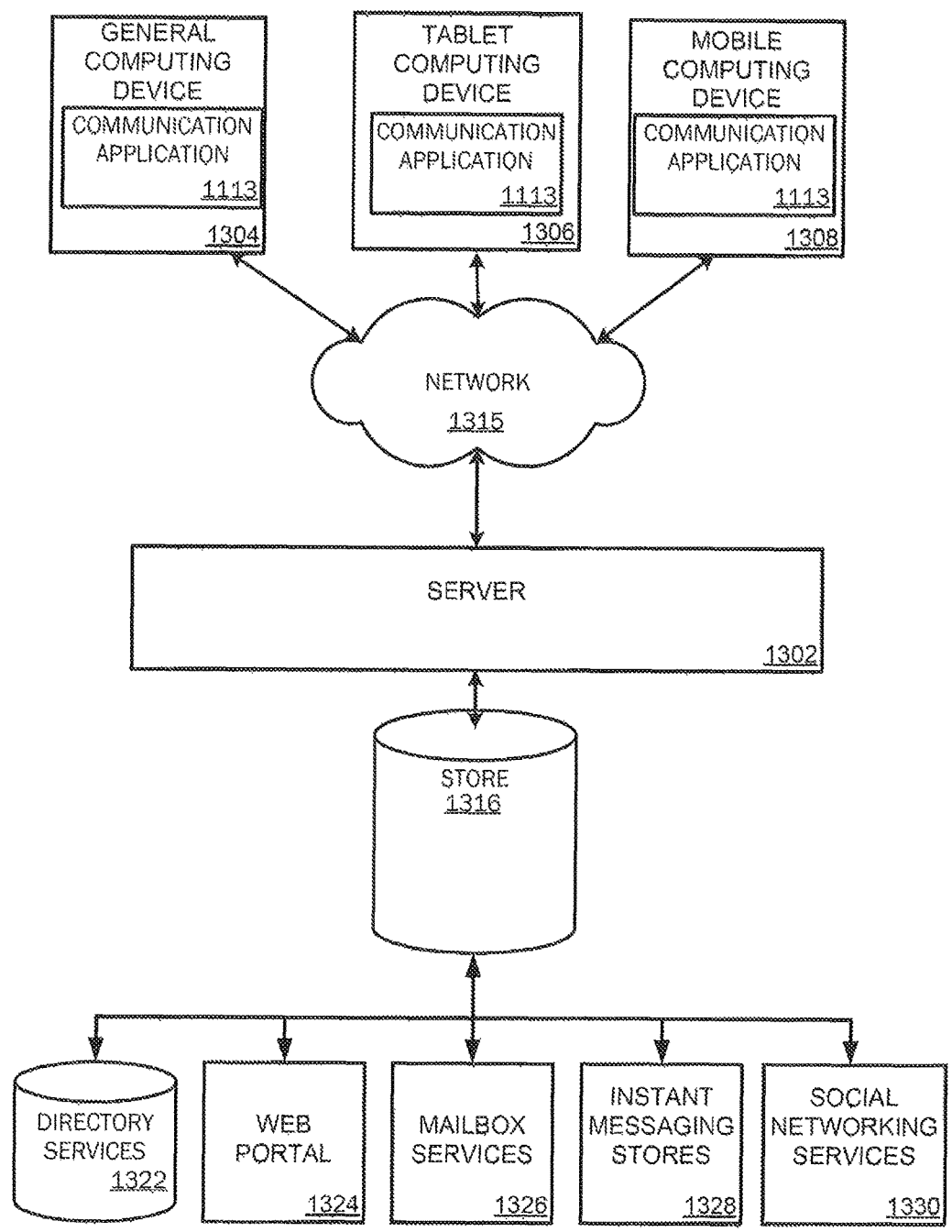
FIG. 13 is a simplified block diagram of a distributed computing system in which embodiments of the present disclosure may be practiced.

FIG. 13 illustrates one embodiment of the architecture of a system for processing data received at a computing system from a remote source, such as a computing device 1304, tablet 1306, or mobile device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking site 1330. The communication application 1113 may be employed by a client who communicates with server 1302. The server 1302 may provide data to and from a client computing device such as a personal computer 1304, a tablet computing device 1306 and/or a mobile computing device 1308 (e.g., a smart phone) through a network 1315. By way of example, the computer system described above with respect to FIGS. 1-6 may be embodied in a personal computer 1304, a tablet computing device 1306 and/or a mobile computing device 1308 (e.g., a smart phone). Any of these embodiments of the computing devices may obtain content from the store 1316, in addition to receiving graphical data useable to be either pre-processed at a graphic-originating system, or post-processed at a receiving computing system.

Figure 14:
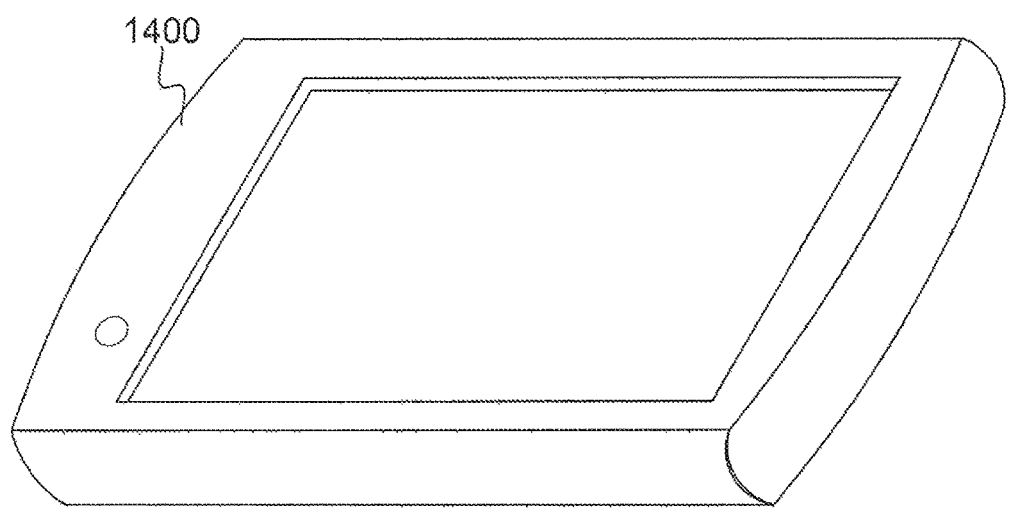
FIG. 14 illustrates a tablet computing device for executing one or more embodiments of the present disclosure.

FIG. 14 illustrates an exemplary tablet computing device 1400 that may execute one or more embodiments disclosed herein. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the disclosure as claimed in any way. The embodiments, examples, and details provided in this application are considered sufficient to convey possession and enable others to make and use the best mode of claimed disclosure. The claimed disclosure should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed disclosure.

The invention claimed is:

1. A method for converting text to speech, the method comprising:
   receiving text input into a plurality of first level recurrent neural networks;
   determining, by a first recurrent neural network in the plurality of first level recurrent neural networks, one or more properties of the text input from the group consisting of: part-of-speech properties, phonemes, linguistic prosody properties, contextual properties, and semantic properties;
   determining, by a second recurrent neural network in the plurality of first level recurrent neural networks, one or more properties of the text input from the group consisting of: part-of-speech properties, phonemes, linguistic prosody properties, contextual properties, and semantic properties, wherein the determined one or properties by the second recurrent neural network is different from the determined one or more properties by the first recurrent neural network;
   receiving, by a recurrent neural network in a second level, the determined properties from the first recurrent neural network in the plurality of first level recurrent neural networks and the second recurrent neural network in the plurality of first level recurrent neural networks;
   determining by the recurrent neural network in the second level, phonetic properties for the text input based on the properties received from the first recurrent neural network in the plurality of first level recurrent neural networks and the second neural network in the plurality of first level recurrent neural networks, wherein the recurrent neural network in the second level is different from the first recurrent neural network in the plurality of first level recurrent neural networks and the second recurrent neural network in the plurality of first level recurrent neural networks; and
   based on the determined phonetic properties, generating a generation sequence for synthetization by an audio synthesizer.

2. The method of claim 1, wherein the one or more properties received are the part-of-speech properties and phonemes.

3. The method of claim 1, wherein the one or more properties received are the linguistic prosody properties, the contextual properties, and the semantic properties.

4. The method of claim 1, wherein the one or more properties received are the phonemes, the contextual properties, and the semantic properties.

5. The method of claim 1, further comprising optimizing the generation sequence.

6. The method of claim 1, further comprising synthesizing the generation sequence into audible speech.

7. The method of claim 1, wherein the one or more properties are received as a dense auxiliary input.

8. The method of claim 1, wherein the text input and the one or more properties are received as a dense auxiliary input.

9. The method of claim 1, wherein the recurrent neural network in the second level is a part of a hyper-structure module.

10. The method of claim 1, wherein the one or more properties are received by a hidden layer and an output layer of the recurrent neural network in the second level.

11. A computer storage device, having computer-executable instructions that, when executed by at least one processor, perform a method for converting text-to-speech, the method comprising:
   receiving text input into a plurality of first level recurrent neural networks;
   determining, by a first recurrent neural network in the plurality of first level recurrent neural networks, one or more properties of the text input from the group consisting of: part-of-speech properties, phonemes, linguistic prosody properties, contextual properties, and semantic properties;
   determining, by a second recurrent neural network in the plurality of first level recurrent neural networks, one or more properties of the text input from the group consisting of: part-of-speech properties, phonemes, linguistic prosody properties, contextual properties, and semantic properties, wherein the determined one or properties by the second recurrent neural network is different from the determined one or more properties by the first recurrent neural network;
   receiving, by a recurrent neural network in a second level, the determined properties from the first recurrent neural network in the plurality of first level recurrent neural networks and the second recurrent neural networks in the plurality of first level recurrent neural networks;
   determining by the recurrent neural network in the second level, phonetic properties for the text input based on the properties received from the first recurrent neural network in the plurality of first level recurrent neural networks and the second neural network in the plurality of first level recurrent neural networks, wherein the recurrent neural network in the second level is different from the first recurrent neural network in the plurality of first level recurrent neural networks and the second recurrent neural network in the plurality of first level recurrent neural networks; and
   based on the determined phonetic properties, generating a generation sequence for synthetization by an audio synthesizer.

12. The computer storage device of claim 11, wherein the one or more properties received are the part-of-speech properties and phonemes.

13. The computer storage device of claim 11, wherein the one or more properties received are the phonemes, the contextual properties, and the semantic properties.

14. The computer storage device of claim 11, wherein the method further comprises optimizing the generation sequence.

15. The computer storage device of claim 11, wherein the method further comprises synthesizing the generation sequence into audible speech.

16. The computer storage device of claim 11, wherein the one or more properties are received as a dense auxiliary input.

17. The computer storage device of claim 11, wherein the text input and the one or more properties are received as a dense auxiliary input.

18. The computer storage device of claim 11, wherein the recurrent neural network in the second level is a part of a hyper-structure module.

19. The computer storage device of claim 11, wherein the one or more properties are received by a hidden layer and an output layer of the recurrent neural network in the second level.

20. A system for converting text-to-speech comprising: at least one processor; and
   memory encoding computer executable instructions that, when executed by at least one processor, perform a method for converting text to speech, the method comprising:
      receiving text input into a plurality of first level recurrent neural networks;
      determining, by a first recurrent neural network in the plurality of first level recurrent neural networks, one or more properties of the text input from the group consisting of: part-of-speech properties, phonemes, linguistic prosody properties, contextual properties, and semantic properties;
      determining, by a second recurrent neural network in the plurality of first level recurrent neural networks, one or more properties of the text input from the group consisting of: part-of-speech properties, phonemes, linguistic prosody properties, contextual properties, and semantic properties, wherein the determined one or properties by the second recurrent neural network is different from the determined one or more properties by the first recurrent neural network;
      receiving, by a recurrent neural network in a second level, the determined properties from the first recurrent neural network in the plurality of first level recurrent neural networks and the second recurrent neural network in the plurality of first level recurrent neural networks:
      determining by the recurrent neural network in the second level, phonetic properties for the text input based on the properties received from the first recurrent neural network in the plurality of first level recurrent neural networks and second neural network in the plurality of first level recurrent neural networks wherein the recurrent neural network in the second level is different from the first recurrent neural network in the plurality of first level recurrent neural networks and the second recurrent neural network in the plurality of first level recurrent neural networks: and
      based on the determined phonetic properties, generating a generation sequence for synthetization by an audio synthesizer.

\* \* \* \* \*